(12) United States Patent
Mann et al.

(10) Patent No.: US 11,563,512 B2
(45) Date of Patent: Jan. 24, 2023

(54) LINK-ADAPTATION FOR PASSIVE INTERMODULATION AVOIDANCE

(71) Applicant: Telefonaktiebolaget LM Ericsson (publ), Stockholm (SE)

(72) Inventors: Karl Mann, Ottawa (CA); Hatem Abou-Zeid, Ottawa (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/252,125

(22) PCT Filed: Jun. 15, 2018

(86) PCT No.: PCT/IB2018/054435
§ 371 (c)(1),
(2) Date: Dec. 14, 2020

(87) PCT Pub. No.: WO2019/239196
PCT Pub. Date: Dec. 19, 2019

(65) Prior Publication Data
US 2021/0258096 A1 Aug. 19, 2021

(51) Int. Cl.
*H04W 24/00* (2009.01)
*H04L 1/00* (2006.01)
*H04W 24/08* (2009.01)
*H04W 72/12* (2009.01)
*H04W 72/14* (2009.01)

(52) U.S. Cl.
CPC .......... *H04L 1/0003* (2013.01); *H04L 1/0009* (2013.01); *H04L 1/0015* (2013.01); *H04W 24/08* (2013.01); *H04W 72/1268* (2013.01); *H04W 72/14* (2013.01)

(58) Field of Classification Search
None
See application file for complete search history.

(56) References Cited

U.S. PATENT DOCUMENTS

| 9,432,131 B2 | 8/2016 | Lindoff et al. |
| 10,389,476 B2* | 8/2019 | Stephenne ............ H04L 1/0036 |
| 2013/0242939 A1 | 9/2013 | Wagner |
| 2015/0139009 A1 | 5/2015 | Park et al. |
| 2019/0052381 A1* | 2/2019 | Abdelmonem ...... H04J 11/0026 |

FOREIGN PATENT DOCUMENTS

WO 2017/093784 A1 6/2017

OTHER PUBLICATIONS

International Search Report and Written Opinion dated Jul. 12, 2018 issued in PCT Application No. PCT/IB2018/054435, consisting of 12 pages.

* cited by examiner

*Primary Examiner* — Willie J Daniel, Jr.
(74) *Attorney, Agent, or Firm* — Sage Patent Group

(57) ABSTRACT

Methods and apparatuses are disclosed for link adaption for Passive Intermodulation (PIM) avoidance. In one embodiment, a method includes determining an indication of a link adaption scheme for a wireless communication based at least on a first interference measurement, the first interference measurement measured on a first subset of time resources associated with passive intermodulation, PIM, interference independently of a second interference measurement measured on at least a second subset of time resources, the second subset of time resources being different from the first subset of time resources. The indication of the determined link adaption scheme may be communicated.

24 Claims, 11 Drawing Sheets

LINK-ADAPTATION FOR PASSIVE INTERMODULATION AVOIDANCE

CROSS-REFERENCE TO RELATED APPLICATIONS

This application is a Submission Under 35 U.S.C. § 371 for U.S. National Stage Patent Application of International Application Number: PCT/IB2018/054435, filed Jun. 15, 2018 entitled "LINK-ADAPTATION FOR PASSIVE INTERMODULATION AVOIDANCE," the entirety of which is incorporated herein by reference.

TECHNICAL FIELD

Wireless communication and in particular, to providing link adaption for passive intermodulation avoidance.

BACKGROUND

External passive intermodulation (PIM) may occur when one or multiple base station/first radio node antennas transmit one or multiple signals in one or multiple frequencies, and those signals interact in a non-linear manner with a structure in a propagation environment. This interaction may generate an interfering signal, at a possibly different frequency from the transmitted frequency(ies), which may radiate out of the passive PIM source (referred to as PIM source). This process may be referred to as the "rusty bolt" effect due to junctions of different materials/metals such as the un-rusted bolt portion and the rusted bolt portion that may cause PIM. In other words, in some examples, the mechanical components of the wireless communication system itself, such as rusty bolts, may become PIM sources, although other structures in the propagation environment may also become PIM sources. These PIM sources may generate interfering signal(s) that may interfere with reception of an intended wireless signal at a receiver such as a first radio node receiver. One existing manner of handling external PIM is to detect that a PIM issue exists, and to send a highly skilled technician to an antenna site to clean the antenna site to make sure that any "rusty bolt" or other component that might contribute to PIM is removed, repaired, tightened and/or replaced. This approach is very costly.

In particular, PIM impacts Frequency Division Duplex (FDD) systems where the radios transmit and receive at the same time but on different frequency ranges. A common PIM source is when two downlink (DL) carriers mix producing unwanted products in the neighboring uplink (UL) frequencies. These products may arise from non-linearities in passive radio components, such as, for example, coaxial connections, cables and bolts, or due to other external reflections.

When the PIM frequency components fall into a neighboring receiver's frequency range, the over-all receiver noise is increased, and degrades UL key performance indicators (KPIs) such as throughput, retainability, accessibility, etc. The existence and adverse effects of PIM may become more prominent as the spectrum becomes more crowded, particularly with multi-band transmission deployments, such as, for example, Carrier Aggregation (CA). Further, the existence and adverse effects of PIM may increase, particularly for UL traffic from Internet-of-Things (IoT)-based applications that demand scalable, accessibility and/or reliability.

Existing solutions for PIM cancellation, particularly in the uplink receiver ranges typically require the purchase and installation of additional hardware, which is costly.

SUMMARY

Some embodiments of the present disclosure advantageously provide methods and apparatuses for link adaption for PIM avoidance.

According to one aspect of the disclosure, a base station is provided. The base station includes processing circuitry configured to determine an indication of a link adaption scheme for a wireless communication based at least on a first interference measurement, the first interference measurement measured on a first subset of time resources associated with passive intermodulation, PIM, interference independently of a second interference measurement measured on at least a second subset of time resources, the second subset of time resources being different from the first subset of time resources, and cause communication of the indication of the determined link adaption scheme.

According to one embodiment of this aspect, the link adaption scheme for the wireless communication is for an uplink transmission corresponding to a communication from a user equipment, UE, to the base station. According to another embodiment of this aspect, the processing circuitry is further configured to determine the link adaption scheme for the wireless communication based at least on the first interference measurement by determining at least a coding rate for the wireless communication based on at least the first interference measurement. In some embodiments of this aspect, the processing circuitry is further configured to determine the link adaption scheme for the wireless communication based at least on the first interference measurement by determining at least a modulation and coding scheme, MCS, for the wireless communication based on at least the first interference measurement. In some embodiments of this aspect, the processing circuitry is further configured to determine the link adaption scheme for the wireless communication based at least on the first interference measurement by determining at least a modulation and coding scheme, MCS, and a transport block size, TBS, for the wireless communication based on at least the first interference measurement. In some embodiments of this aspect, the processing circuitry is further configured to measure the first interference measurement on the first subset of resources associated with the PIM interference, and independently of the measurement of the first interference measurement, measure the second interference measurement on the at least the second subset of time resources, the at least the second subset of time resources including time resources indicated as being without PIM interference. In some embodiments of this aspect, the first interference measurement is a signal-to-interference-plus-noise ratio, SINR, for only the first subset of resources associated with the PIM interference. In some embodiments of this aspect, the second interference measurement is an average signal-to-interference-plus-noise ratio, SINR, over a set of time resources, the set of time resources including the at least the second subset of time resources and the first subset of time resources. In some embodiments of this aspect, each time resource of the first subset and the second subset of time resources is a transmission time interval, TTI. In some embodiments of this aspect, the processing circuitry is further configured to at least one of: identify a user equipment, UE, experiencing PIM interference; during a first time resource, communicate an uplink grant to the UE, the uplink grant scheduling the UE for an uplink transmission at a second time resource different from the first time resource; and during the second time resource occurring after the first time resource, reduce a transmit power on at least one downlink transmission from the base station to the UE, the at least one downlink transmission being co-scheduled with the scheduled uplink transmission for the UE at the second time resource. In some embodiments of this aspect, the determination of the link adaption scheme for the wireless communication based at least on the first interference measurement is a result of an identification of a user equipment, UE, as experiencing the PIM interference and is responsive to determining that the UE is scheduled for an uplink grant. In some embodiments of this aspect, the processing circuitry is further configured to, as a result of the first interference measurement and the second interference measurement, estimate an interference gain associated with the PIM interference. In some embodiments of this aspect, the processing circuitry is further configured to use the interference gain associated with the PIM interference to determine the link adaption scheme for the wireless communication based at least on the first interference measurement. In some embodiments, the link adaption scheme may be a link adaptation value (or output value). In some embodiments of this aspect, the interference gain is a PIM interference gain, the PIM interference gain corresponding to a difference between a first signal-to-interference-plus-noise ratio, SINR, and a second SINR, the first SINR being an average SINR averaged over at least the second subset of time resources and the second SINR being an estimated SINR, the estimated SINR estimated using only time resources associated with the PIM interference. In some embodiments of this aspect, the processing circuitry is further configured to communicate the indication of the determined link adaptation scheme to a plurality of user equipments, UEs, served by the base station and scheduled for an uplink transmission during a time resource on which the link adaption scheme is to be applied by the plurality of UEs. In some embodiments of this aspect, the processing circuitry is further configured to communicate the indication of the determined link adaptation scheme to all user equipments, UEs, served by the base station and scheduled for an uplink transmission on a time resource during which the link adaption scheme is to be applied by the UEs.

According to another aspect, a method for a base station is provided. The method includes determining an indication of a link adaption scheme for a wireless communication based at least on a first interference measurement, the first interference measurement measured on a first subset of time resources associated with passive intermodulation, PIM, interference independently of a second interference measurement measured on at least a second subset of time resources, the second subset of time resources being different from the first subset of time resources, and causing communication of the indication of the determined link adaption scheme.

According to one embodiment of this aspect, the link adaption scheme for the wireless communication is for an uplink transmission corresponding to a communication from a user equipment, UE, to the base station. In some embodiments of this aspect, determining the link adaption scheme for the wireless communication based at least on the first interference measurement further comprises determining at least a coding rate for the wireless communication based on at least the first interference measurement. In some embodiments of this aspect, determining the link adaption scheme for the wireless communication based at least on the first interference measurement further comprises determining at least a modulation and coding scheme, MCS, for the wireless communication based on at least the first interference measurement. In some embodiments of this aspect, determining the link adaption scheme for the wireless communication based at least on the first interference measurement further comprises determining at least a modulation and coding scheme, MCS, and a transport block size, TBS, for the wireless communication based on at least the first interference measurement. In some embodiments of this aspect, the method further comprises measuring the first interference measurement on the first subset of resources associated with the PIM interference; and independently of the measuring of the first interference measurement, measuring the second interference measurement on the at least the second subset of time resources, the at least the second subset of time resources including time resources indicated as being without PIM interference. In some embodiments of this aspect, the first interference measurement is a signal-to-interference-plus-noise ratio, SINR, for only the first subset of resources associated with the PIM interference. In some embodiments of this aspect, the second interference measurement is an average signal-to-interference-plus-noise ratio, SINR, over a set of time resources, the set of time resources including the at least the second subset of time resources and the first subset of time resources. In some embodiments of this aspect, each time resource of the first subset and the second subset of time resources is a transmission time interval, TTI. In some embodiments of this aspect, the method further includes at least one of: identifying a user equipment, UE, experiencing PIM interference; during a first time resource, communicating an uplink grant to the UE, the uplink grant scheduling the UE for an uplink transmission at a second time resource different from the first time resource; and during the second time resource occurring after the first time resource, reducing a transmit power on at least one downlink transmission from the base station to the UE, the at least one downlink transmission being co-scheduled with the scheduled uplink transmission for the UE at the second time resource. In some embodiments of this aspect, the determination of the link adaption scheme for the wireless communication based at least on the first interference measurement is a result of an identification of a user equipment, UE, as experiencing the PIM interference and is responsive to determining that the UE is scheduled for an uplink grant. In some embodiments of this aspect, the method further includes, as a result of the first interference measurement and the second interference measurement, estimating an interference gain associated with the PIM interference. In some embodiments of this aspect, the method further includes using the interference gain associated with the PIM interference to determine the link adaption scheme and/or a link adaptation value (or output value) for the wireless communication based at least on the first interference measurement. In some embodiments of this aspect, the interference gain is a PIM interference gain, the PIM interference gain corresponding to a difference between a first signal-to-interference-plus-noise ratio, SINR, and a second SINR, the first SINR being an average SINR averaged over at least the second subset of time resources and the second SINR being an estimated SINR, the estimated SINR estimated using only time resources associated with the PIM interference. In some embodiments of this aspect, the communicating the indication of the link adaption scheme comprises communicating the indication of the determined link adaptation scheme to a plurality of user equipments, UEs, served by the base station and scheduled for an uplink transmission during a time resource on which the link adaption scheme is to be applied by the plurality of UEs. In some embodiments of this aspect, the communicating the indication of the link adaption scheme comprises communicating the indication of the determined link adaptation scheme to all user equipments, UEs, served by the base station and scheduled for an uplink transmission on a time resource during which the link adaption scheme is to be applied by the UEs.

In another aspect of the present disclosure, a user equipment, UE, is provided. The UE includes processing circuitry configured to receive an indication of a link adaption scheme for a wireless communication, the link adaption scheme being based at least on a first interference measurement, the first interference measurement measured on a first subset of time resources associated with passive intermodulation, PIM, interference independently of a second interference measurement measured on at least a second subset of time resources, the second subset of time resources being different from the first subset of time resources, and cause communication of the wireless communication according to the link adaption scheme.

In one embodiment of this aspect, the wireless communication is an uplink transmission corresponding to a communication from the UE to a base station. In some embodiments of this aspect, the indication of the link adaption scheme for the wireless communication includes at least an indication of a coding rate for the wireless communication based on at least the first interference measurement. In some embodiments of this aspect, the indication of the link adaption scheme for the wireless communication includes at least an indication of at least a modulation and coding scheme, MCS, for the wireless communication based on at least the first interference measurement. In some embodiments of this aspect, the indication of the link adaption scheme for the wireless communication includes at least an indication of at least a modulation and coding scheme, MCS, and a transport block size, TBS, for the wireless communication based on at least the first interference measurement. In some embodiments of this aspect, the first interference measurement is a signal-to-interference-plus-noise ratio, SINR, for only the first subset of resources associated with the PIM interference. In some embodiments of this aspect, the second interference measurement is an average signal-to-interference-plus-noise ratio, SINR, over a set of time resources, the set of time resources including the at least the second subset of time resources and the first subset of time resources. In some embodiments of this aspect, each time resource of the first subset and the second subset of time resources is a transmission time interval, TTI. In some embodiments of this aspect, the link adaptation scheme for the wireless communication is based on an interference gain, the interference gain based on the first interference measurement associated with the PIM interference and the second interference measurement. In some embodiments of this aspect, the interference gain is a PIM interference gain, the PIM interference gain corresponding to a difference between a first signal-to-interference-plus-noise ratio, SINR, and a second SINR, the first SINR being an average SINR averaged over at least the second subset of time resources and the second SINR being an estimated SINR, the estimated SINR estimated using only time resources associated with the PIM interference.

According to yet another aspect of the present disclosure, a method for a user equipment, UE, is provided. The method includes receiving an indication of a link adaption scheme for a wireless communication, the link adaption scheme being based at least on a first interference measurement, the first interference measurement measured on a first subset of time resources associated with passive intermodulation, PIM, interference independently of a second interference measurement measured on at least a second subset of time resources, the second subset of time resources being different from the first subset of time resources. The method includes causing communication of the wireless communication according to the link adaption scheme.

In one embodiment of this aspect, the wireless communication is an uplink transmission corresponding to a communication from the UE to a base station. In some embodiments of this aspect, the indication of the link adaption scheme for the wireless communication includes at least an indication of a coding rate for the wireless communication based on at least the first interference measurement. In some embodiments of this aspect, the indication of the link adaption scheme for the wireless communication includes at least an indication of at least a modulation and coding scheme, MCS, for the wireless communication based on at least the first interference measurement. In some embodiments of this aspect, the indication of the link adaption scheme for the wireless communication includes at least an indication of at least a modulation and coding scheme, MCS, and a transport block size, TBS, for the wireless communication based on at least the first interference measurement. In some embodiments of this aspect, the first interference measurement is a signal-to-interference-plus-noise ratio, SINR, for only the first subset of resources associated with the PIM interference. In some embodiments of this aspect, the second interference measurement is an average signal-to-interference-plus-noise ratio, SINR, over a set of time resources, the set of time resources including the at least the second subset of time resources and the first subset of time resources. In some embodiments of this aspect, each time resource of the first subset and the second subset of time resources is a transmission time interval, TTI. In some embodiments of this aspect, the link adaptation scheme for the wireless communication is based on an interference gain, the interference gain determined based on the first interference measurement associated with the PIM interference and the second interference measurement. In some embodiments of this aspect, the interference gain is a PIM interference gain, the PIM interference gain corresponding to a difference between a first signal-to-interference-plus-noise ratio, SINR, and a second SINR, the first SINR being an average SINR averaged over at least the second subset of time resources and the second SINR being an estimated SINR, the estimated SINR estimated using only time resources associated with the PIM interference.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 2 is a schematic diagram illustrating a limitation of current Link Adaptation with PIM-AS;

DETAILED DESCRIPTION

Figure 1:
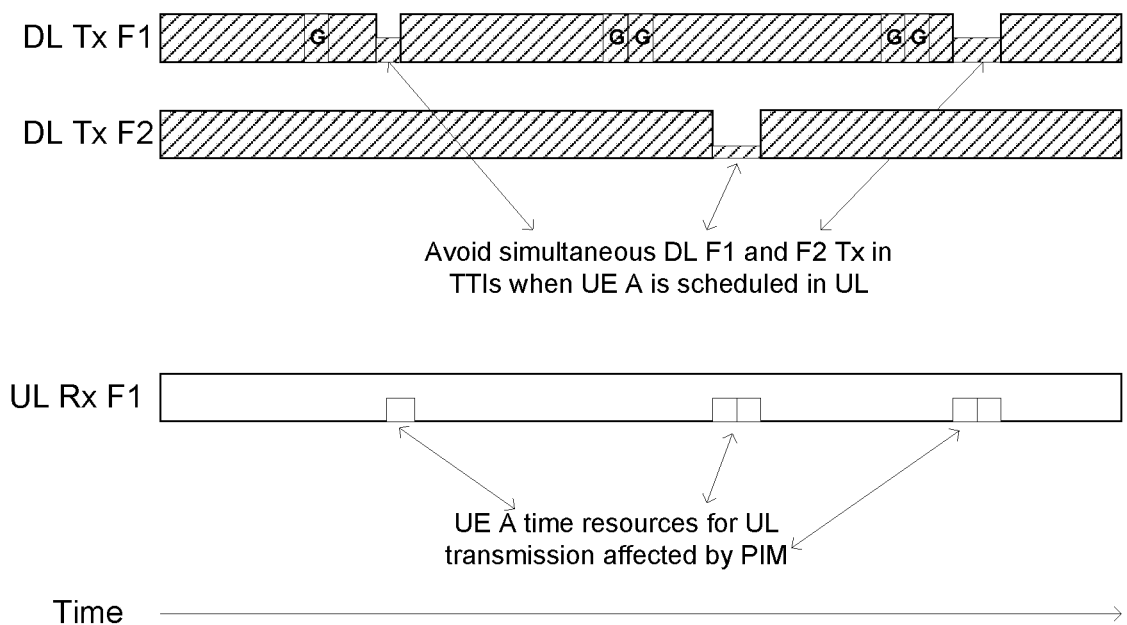
FIG. 1 is a schematic diagram that illustrates an exemplary PIM Avoidance Scheduling.

Some embodiments of the disclosure provide methods and devices for configuring link adaption for PIM avoidance. Some embodiments of the disclosure may advantageously improve uplink KPIs considerably and can mitigate existing KPI limitations associated with traditional UL link adaptation. The teachings of the disclosure relate to interference avoidance in wireless communication systems. In particular, some embodiments of the disclosure relate to baseband solutions that mitigate Passive Intermodulation (PIM) in the uplink (UL).

Before describing in detail exemplary embodiments, it is noted that the embodiments reside primarily in combinations of apparatus components and processing steps related to link adaption for PIM avoidance. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof. In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "base station" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The base station may also comprise test equipment. The term "radio node" used herein may be used to also denote a wireless device (WD) or a user equipment (UE) or a radio network node.

In some embodiments, the non-limiting terms wireless device (WD) or a user equipment (UE) are used interchangeably. The UE herein can be any type of wireless device capable of communicating with a base station or another UE over radio signals, such as wireless device (WD). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a UE or a base station may be distributed over a plurality of UEs and/or base stations. In other words, it is contemplated that the functions of the base station and UE described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Many of the existing techniques for PIM avoidance focus on cancelling PIM in the radio. More recently, baseband mitigation approaches have been proposed, such as, PIM avoidance scheduling. A main idea of baseband mitigation is to modify the DL scheduler such that the two downlink carriers causing PIM do not transmit at high loads simultaneously, as shown, for example, in FIG. 1. For example, FIG. 1 illustrates that either or both of DL frequency F1 and/or DL frequency F2 will have a reduced transmit (TX) power for transmission time intervals (TTIs) that user equipment (UE) A has been scheduled in the UL. Thus, PIM may be reduced and the UE can have a better UL SINR in that TTI, as compared to UL SINR if the TX power was not reduced in such TTI. As can be seen in FIG. 1, the DL transmissions at frequency F1 or F2 that are vertically overlapping (i.e., in the same time resource) UL transmissions, are at a reduced power (indicated by the reduced height cross-hatched boxes). In FIG. 1, "G" indicates a time resource for UL grant transmission to a UE A, which is vulnerable to PIM issues. These and other similar techniques may be referred to as PIM Avoidance Scheduling (PIM-AS). PIM-AS may include reducing the PIM product power in the UL and may improve UL KPIs.

Unfortunately, in some existing networks, these improvements may also result in a potential reduction in DL throughput, particularly at high DL loads.

It should be noted that although FIG. 1 only illustrates two aggressor frequencies, F1 and F2, there may, in some embodiments, be more than two aggressor frequencies, which can complicate the implementation of the separate PIM and non-PIM measurements, using the techniques described herein.

Since the issue of PIM may become more severe as operators utilize more frequencies for communication, cost effective software-based solutions that can mitigate PIM or avoid PIM may be explored instead of or in addition to PIM cancellation techniques that focus on cancelling PIM in the radio. In some embodiments, PIM avoidance may generally relate to attempting to avoid PIM generation and/or reception as opposed to at least partial PIM cancellation of a received PIM interference.

The complexity and cost of PIM cancellation in the radio has led to the use of baseband mitigation techniques, such as PIM-AS. However, the existing UL link adaptation (LA) procedure in base stations can limit the UL gains considerably and/or indirectly throttle the benefits that can be achieved from PIM-AS.

Figure 2:
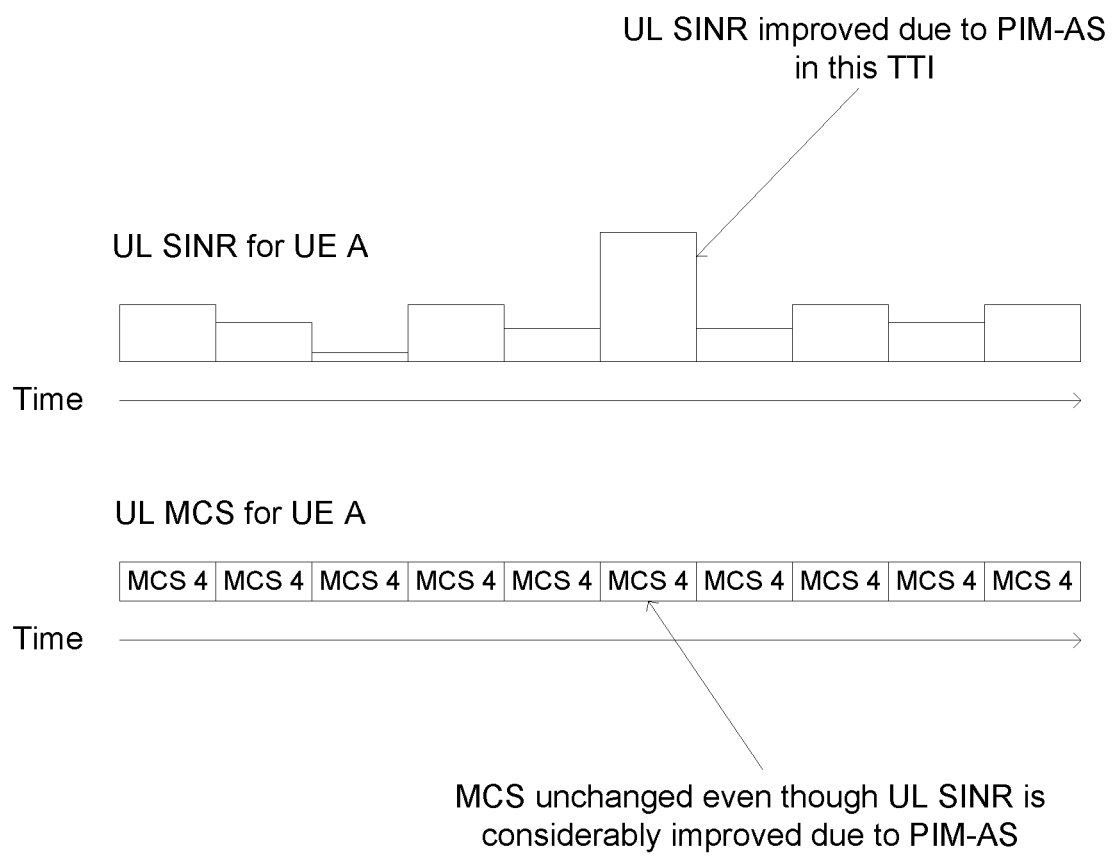

Typically, LA has 3 factors MCS (which includes coding rate and modulation level), transport block size, and number of resource blocks (physical resource block, PRBs in LTE and NR). It happens that in 3GPP, the Physical Resource Blocks (PRBs) and the Modulation and Coding Scheme (MCS) are communicated to the UE, and the UE computes the Transport Block (TB) size that matches those. Both the base station and UE will compute the same value, therefore sending 2 of the 3 values is generally sufficient. According to some embodiments of the present disclosure, 2 of the factors are emphasized, namely MCS and transport block size. The third factor, the number of resource blocks, may be constant for any instance of evaluation. However, other embodiments may consider different combination of these 3 factors. Specifically, existing link adaption procedures may provide for the coding rate (e.g., Modulation and Coding Scheme (MCS) selection in Long-Term Evolution (LTE) and New Radio (NR)) to be based on an average uplink quality, which may include the PIM interference. For example, in some wireless networks, LA uses the average Signal-to-Noise Ratio (SINR) to select a coding rate, because the SINR is not usually expected to have sudden variations in SINR. Even if variations in SINR occur, they are typically not predictable. Because PIM-AS may be generally applied in only a subset of the Transmission Time Intervals (TTIs) (e.g., 5-10%), the average uplink SINR may be considerably lower than the sudden improvements in uplink SINR when PIM-AS is applied, as illustrated, for example, in FIG. 2. FIG. 2 shows that even though the SINR is improved greatly when PIM-AS is applied, the MCS may not be increased if the LA uses the average SINR; therefore, the abrupt increase in SINR may not be leveraged with some existing LA techniques. Existing UL LA techniques are not aware of this instantaneous increase in link quality because existing UL LA techniques base the selection of the coding rate on the average SINR. Therefore, the UL performance gains for PIM-AS may be considerably limited. Further, PIM-AS may decrease the DL throughput because PIM-AS may be applied more frequently to satisfy the UE or user equipment (WD) UL demands. Thus, existing UL LA techniques, which do not consider PIM-AS, can result in a lost opportunity to increase UL throughput, and deliver data in a shorter time frame.

Accordingly, some embodiments of the present disclosure propose a modification to how link adaptation is performed when PIM-AS is applied. Such embodiments may improve uplink KPIs considerably and can mitigate existing KPI limitations associated with traditional link adaptation techniques.

For example, some embodiments of the present disclosure advantageously leverage the fact that when PIM-AS is applied at a particular time (e.g., TTI), the UL SINR may be considerably higher than the average UL SINR (which may include PIM interference) normally used for UL link adaptation. Further, some embodiments of the present disclosure provide for estimating (via e.g., measurements) the difference between SINR when PIM-AS is applied and the average SINR.

Some embodiments may measure and utilize two groups of PIM and non-PIM resources according to the techniques described herein. In further embodiments, there can be more than two groups of measurements and corresponding LA parameters, such as, for example, three, four, and even more of such groups, where the groups can correspond to for example levels of PIM or DL scheduling load on the aggressor frequencies/DLs. In some embodiments, the levels of PIM or DL scheduling load may be hierarchical levels, where each level may correspond to a different LA scheme or interference gain. The higher the number of aggressor frequencies, the more complicated the implementation of the separate measurements may become.

In some embodiments of the present disclosure, methods and apparatuses for measuring and recording/storing the UE UL interference (e.g., SINR) during the time periods (e.g., TTIs) that PIM-AS is applied. Some embodiments may further include utilizing the measured and stored UE UL interference (e.g., SINR) for link adaptation during time periods (e.g., TTIs) that PIM-AS is applied, instead of, for example, the average UL SINR used in some existing LA techniques.

Under PIM conditions, some embodiments of the present disclosure may advantageously remove the current bottleneck/throttle imposed by conventional LA and may allow the PIM-AS SINR gains to be efficiently converted to throughput gains. In other words, using at least some of the techniques disclosed in the present disclosure, UL KPIs such as throughput, accessibility and retainability can be improved over conventional PIM-AS. Some embodiments of the disclosure may also indirectly reduce the use of muted physical resources (e.g., physical resource blocks (PRBs)) and/or the use of lowering the DL carrier power, which are used in some PIM-AS techniques.

Some embodiments of the proposed link adaptation modification may improve the UL throughput for both UEs that are severely impacted by PIM as well as UEs that are not as vulnerable to PIM. By optimizing the link adaptation (e.g., UL link adaption), the number of UEs served by a base station may also be increased.

Further, because some embodiments of the present disclosure involve primarily computations that can be implemented as a computer program (software) running on existing hardware, such embodiments may advantageously be implemented without the additional costs associated with purchasing and installing additional hardware, as with some existing PIM cancellation techniques.

In addition, currently, in LTE and NR, the base station controls scheduling, as well as the final MCS selection. Thus, the LA for both UL and DL is hosted in the base station. Some embodiments of the disclosure pertain to this aspect. Furthermore, in some embodiments, the measurement (of, e.g., UL interference) takes place in the UL receiver of the base station, which requires coordination with the DL scheduler to categorize PIM or non-PIM.

Figure 3:
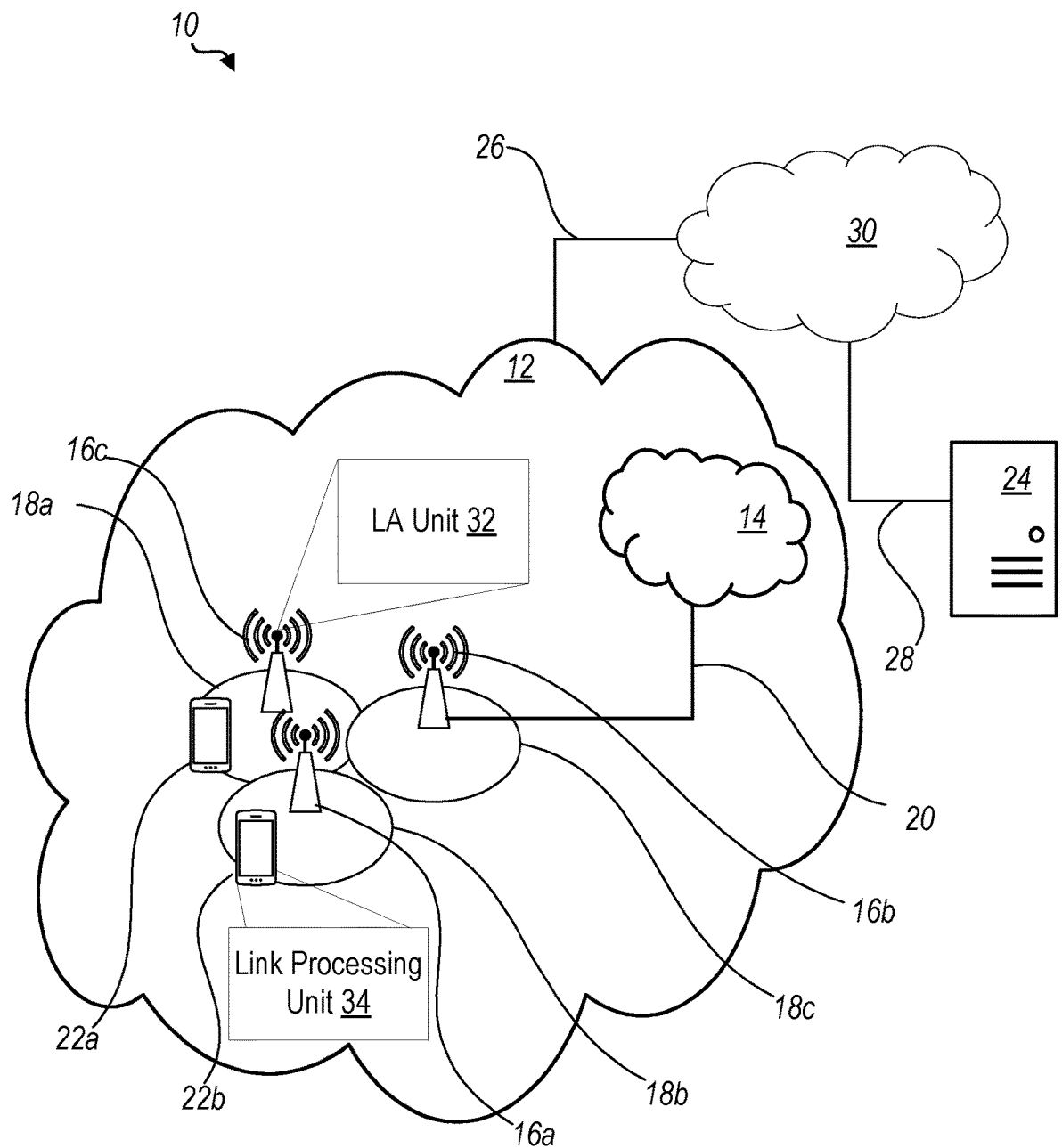
FIG. 3 is a schematic diagram of an exemplary network architecture illustrating a communication system connected via an intermediate network to a host computer according to the principles in the disclosure.

Returning again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of base stations 16a, 16b, 16c (referred to collectively as base stations 16), such as NBs, eNBs, gNBs or other types of wireless access points, each defining a corresponding coverage area 18a, 18b, 18c (referred to collectively as coverage areas 18). Each base station 16a, 16b, 16c is connectable to the core network 14 over a wired or wireless connection 20. A first user equipment (UE) 22a located in coverage area 18a is configured to wirelessly connect to, or be paged by, the corresponding base station 16c. A second UE 22b in coverage area 18b is wirelessly connectable to the corresponding base station 16a. While a plurality of UEs 22a, 22b (collectively referred to as user equipments 22) are illustrated in this example, the disclosed embodiments are equally applicable to a situation where a sole UE is in the coverage area or where a sole UE is connecting to the corresponding base station 16. Note that although only two UEs 22 and three base stations 16 are shown for convenience, the communication system may include many more UEs 22 and base stations 16.

Also, it is contemplated that a UE 22 can be in simultaneous communication and/or configured to separately communicate with more than one base station 16 and more than one type of base station 16. For example, a UE 22 can have dual connectivity with a base station 16 that supports LTE and the same or a different base station 16 that supports NR. As an example, UE 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected UEs 22a, 22b and the host computer 24. The connectivity may be described as an over-the-top (OTT) connection. The host computer 24 and the connected UEs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a base station 16 may not or need not be informed about the past routing of an incoming downlink communication with data originating from a host computer 24 to be forwarded (e.g., handed over) to a connected UE 22a. Similarly, the base station 16 need not be aware of the future routing of an outgoing uplink communication originating from the UE 22a towards the host computer 24.

A base station 16 is configured to include link adaption unit 32 which is configured to determine an indication of a link adaption scheme for a wireless communication based at least on a first interference measurement, the first interference measurement measured on a first subset of time resources associated with passive intermodulation, PIM, interference independently of a second interference measurement measured on at least a second subset of time resources, the second subset of time resources being different from the first subset of time resources, and cause communication of the indication of the determined link adaption scheme. In some embodiments, such determination of an indication of the link adaption scheme may be performed using a single link adaptor or multiple link adaptors, as will be described in more detail below, particularly with reference to FIGS. 9-11. In some embodiments, there may be various subsets of time resources during which such PIM interference measurements are made, which may be based on, for example, the downlink load on a cell being served by the base station 16 and/or a level of uplink PIM interference. In some embodiments, the link adaption scheme may be performed on different channels, such as, for example, Physical Uplink Shared Channel (PUSCH), Physical Uplink Control Channel (PUCC), etc.

A user equipment 22 is configured to include a link processing unit 34 which is configured to receive an indication of a link adaption scheme for a wireless communication, the link adaption scheme being based at least on a first interference measurement, the first interference measurement measured on a first subset of time resources associated with passive intermodulation, PIM, interference independently of a second interference measurement measured on at least a second subset of time resources, the second subset of time resources being different from the first subset of time resources, and cause communication of the wireless communication according to the link adaption scheme.

Example implementations, in accordance with an embodiment, of the UE 22, base station 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a UE 22 connecting via an OTT connection 52 terminating at the UE 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the base station 16 and/or the user equipment 22. The processing circuitry 42 of the host computer 24 may include a monitor unit 54 configured to enable the service provider to observe, monitor, control, transmit to and/or receive from the base station 16 and/or the user equipment 22.

The communication system 10 further includes a base station 16 provided in a communication system 10 and comprising hardware 58 enabling it to communicate with the host computer 24 and with the UE 22. The hardware 58 may include a communication interface 60 for setting up and maintaining a wired or wireless connection with an interface of a different communication device of the communication system 10, as well as a radio interface 62 for setting up and maintaining at least a wireless connection 64 with a UE 22 located in a coverage area 18 served by the base station 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the base station 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the base station 16 further has software 74 stored internally in, for example, memory 72, or stored in external memory (e.g., database, storage array, network storage device, etc.) accessible by the base station 16 via an external connection. The software 74 may be executable by the processing circuitry 68. The processing circuitry 68 may be configured to control any of the methods and/or processes described herein and/or to cause such methods, and/or processes to be performed, e.g., by base station 16. Processor 70 corresponds to one or more processors 70 for performing base station 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to base station 16. For example, processing circuitry 68 of the base station 16 may include link adaption unit 32 configured to determine, cause communication of, and/or implement a link adaption scheme according to the principles of the present disclosure, such as, for example, according to the methods described with reference to the flow chart depicted in FIG. 5.

The communication system 10 further includes the UE 22 already referred to. The UE 22 may have hardware 80 that may include a radio interface 82 configured to set up and maintain a wireless connection 64 with a base station 16 serving a coverage area 18 in which the UE 22 is currently located. The radio interface 82 may be formed as or may include, for example, one or more RF transmitters, one or more RF receivers, and/or one or more RF transceivers.

The hardware 80 of the UE 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 90, which is stored in, for example, memory 88 at the UE 22, or stored in external memory (e.g., database, storage array, network storage device, etc.) accessible by the UE 22. The software 90 may be executable by the processing circuitry 84. The software 90 may include a client application 92. The client application 92 may be operable to provide a service to a human or non-human user via the UE 22, with the support of the host computer 24. In the host computer 24, an executing host application 50 may communicate with the executing client application 92 via the OTT connection 52 terminating at the UE 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by UE 22. The processor 86 corresponds to one or more processors 86 for performing UE 22 functions described herein. The UE 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to UE 22. For example, the processing circuitry 84 of the user equipment 22 may include a link processing unit 34 34 configured to receive an indication of, cause communication according to, and/or implement a link adaption scheme based on an interference measurement in accordance with the principles of the present disclosure, such as, for example, based on the methods described with reference to the flow chart depicted in FIG. 6.

Figure 4:
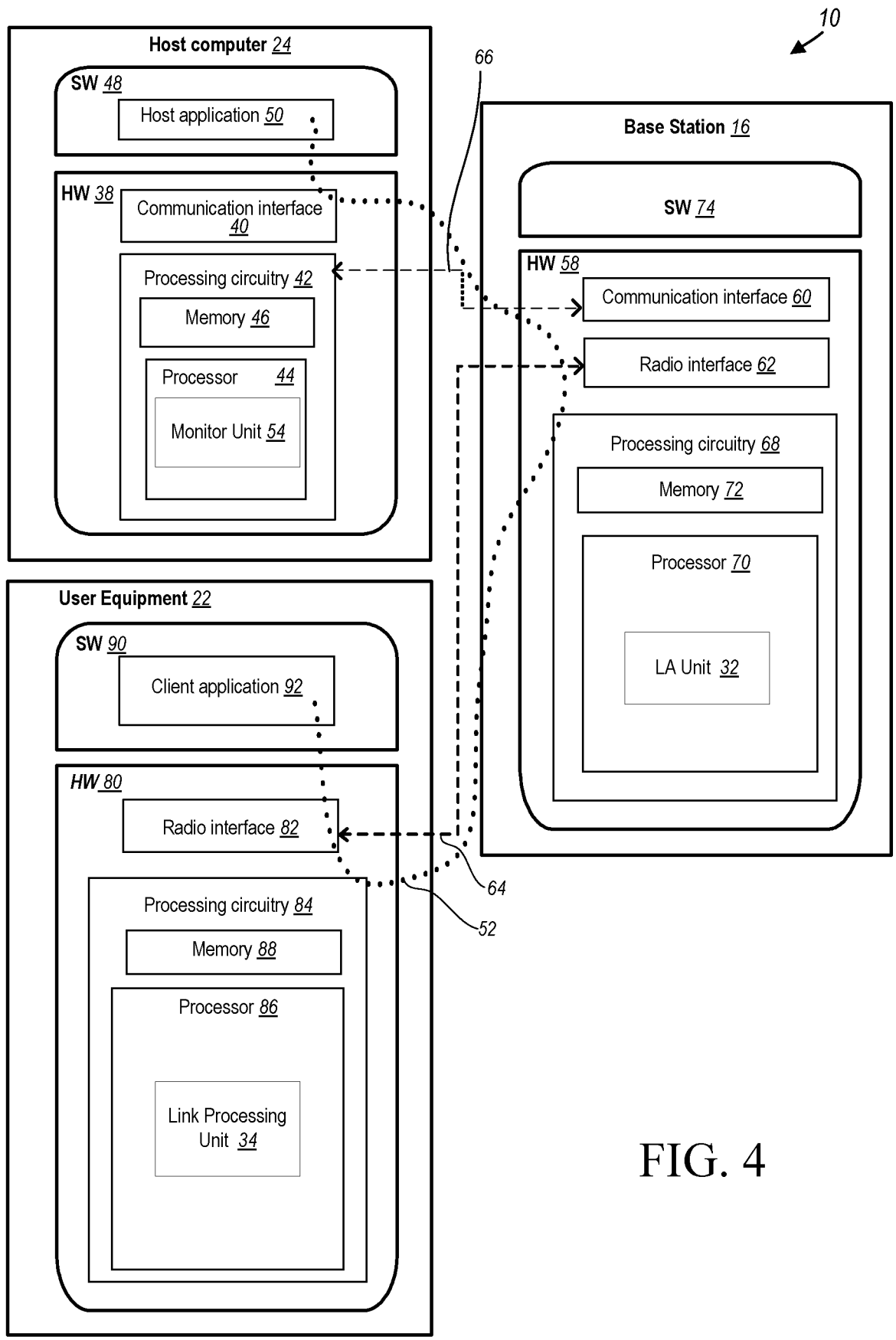
FIG. 4 is a block diagram of a host computer communicating via a first radio node with a user equipment over an at least partially wireless connection according to some embodiments of the disclosure.

In some embodiments, the inner workings of the base station 16, UE 22, and host computer 24 may be as shown in FIG. 4 and independently, the surrounding network topology may be that of FIG. 3.

In FIG. 3, the OTT connection 52 has been drawn abstractly to illustrate the communication between the host computer 24 and the user equipment 22 via the base station 16, without explicit reference to any intermediary devices and the precise routing of messages via these devices. Network infrastructure may determine the routing, which it may be configured to hide from the UE 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the UE 22 and the base station 16 is in accordance with the teachings of the embodiments described throughout this disclosure. One or more of the various embodiments improve the performance of OTT services provided to the UE 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve. There may further be an optional network functionality for reconfiguring the OTT connection 52 between the host computer 24 and UE 22, in response to variations in the measurement results. The measurement procedure and/or the network functionality for reconfiguring the OTT connection 52 may be implemented in the software 48 of the host computer 24 or in the software 90 of the UE 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the base station 16, and it may be unknown or imperceptible to the base station 16. Some such procedures and functionalities may be known and practiced in the art. In certain embodiments, measurements may involve proprietary UE signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the UE 22. In some embodiments, the cellular network also includes the base station 16 with a radio interface 62. In some embodiments, the base station 16 is configured to, and/or the base station's 16 processing circuitry 68 is configured to perform the functions and/or methods described herein for preparing/initiating/maintaining/supporting/ending a transmission to the UE 22, and/or preparing/terminating/maintaining/supporting/ending in receipt of a transmission from the UE 22.

In some embodiments, the host computer 24 includes processing circuitry 42 and a communication interface 40 that is configured to a communication interface 40 configured to receive user data originating from a transmission from a UE 22 to a base station 16. In some embodiments, the UE 22 is configured to, and/or comprises a radio interface 82 and/or processing circuitry 84 configured to perform the functions and/or methods described herein for preparing/initiating/maintaining/supporting/ending a transmission to the base station 16, and/or preparing/terminating/maintaining/supporting/ending in receipt of a transmission from the base station 16.

Although FIGS. 3 and 4 show various "units" such as link adaption unit 32, and link processing unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
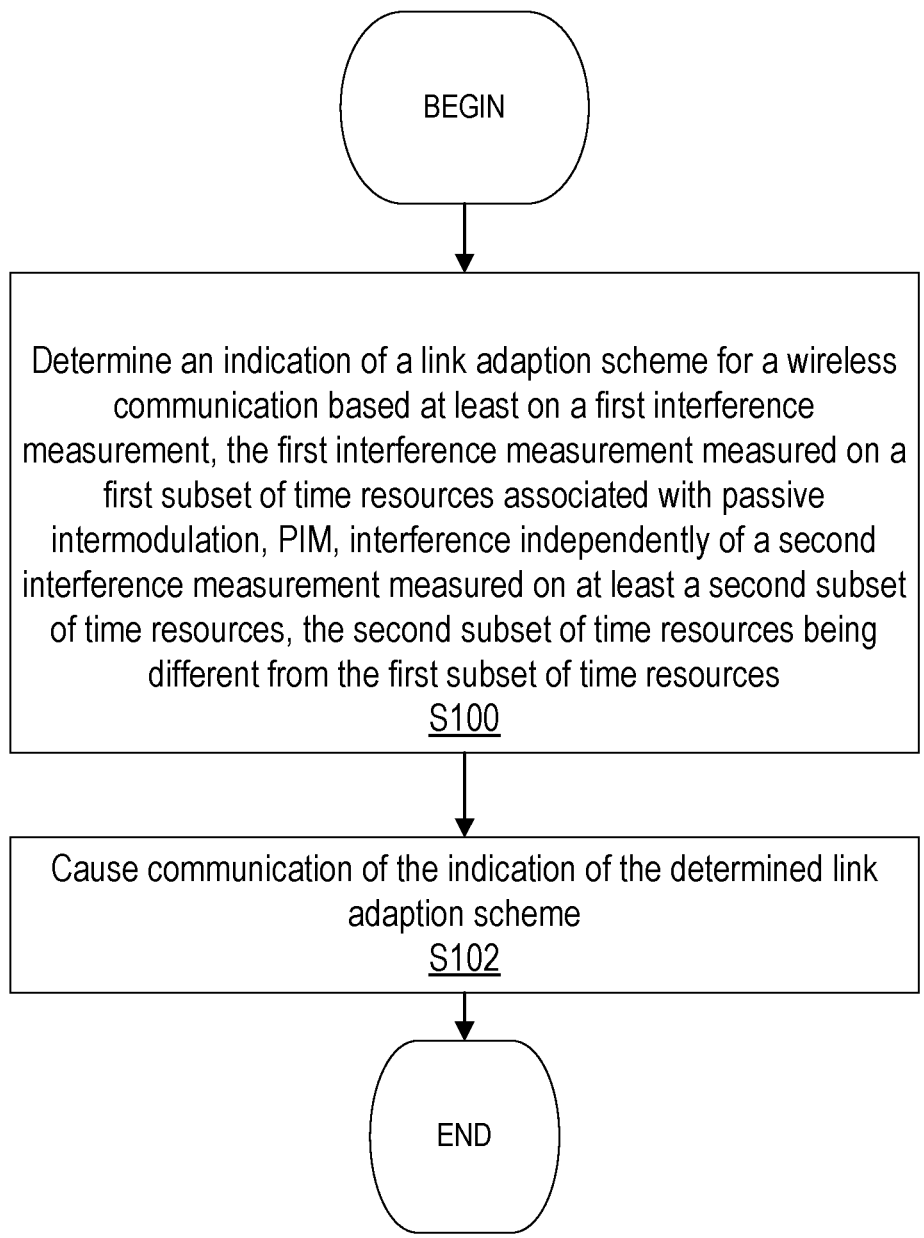
FIG. 5 is a flow diagram of an exemplary link adaptation process in accordance with the principles of the disclosure.

FIG. 5 is a flowchart of an exemplary process in the base station 16 in accordance with the principles of the present disclosure. The base station 16, such as via processing circuitry 68, determines a link adaption scheme for a wireless communication based at least on a first interference measurement, the first interference measurement measured on a first subset of time resources associated with passive intermodulation (PIM) interference independently of a second interference measurement measured on at least a second subset of time resources, the second subset of time resources being different from the first subset of time resources (Block S100). The base station 16, such as via processing circuitry 68, causes communication, via for example radio interface 62, of an indication of the determined link adaption scheme (Block S102).

According to one embodiment of the exemplary method in base station 16, the link adaption scheme for the wireless communication is for an uplink transmission corresponding to a communication from a UE 22 to the base station 16. In some embodiments, determining the link adaption scheme for the wireless communication based at least on the first interference measurement further comprises determining at least a coding rate for the wireless communication based on at least the first interference measurement. In some embodiments, determining the link adaption scheme for the wireless communication based at least on the first interference measurement further comprises determining at least a modulation and coding scheme (MCS) for the wireless communication based on at least the first interference measurement. In some embodiments, determining the link adaption scheme for the wireless communication based at least on the first interference measurement further comprises determining at least a modulation and coding scheme (MCS) and a transport block size (TBS) for the wireless communication based on at least the first interference measurement. In some embodiments, the method includes measuring, such as via processing circuitry 68, the first interference measurement on the first subset of resources associated with the PIM interference, and independently of the measuring of the first interference measurement, measuring the second interference measurement on the at least the second subset of time resources, the at least the second subset of time resources including time resources indicated as being without PIM interference.

In some embodiments, the first interference measurement is a signal-to-interference-plus-noise ratio (SINR) for only the first subset of resources associated with the PIM interference. In some embodiments, the second interference measurement is an average signal-to-interference-plus-noise ratio (SINR) over a set of time resources, the set of time resources including the at least the second subset of time resources and the first subset of time resources. In other words, in some embodiments, there are two measurements, independently averaged over the subsets of PIM and non-PIM resources. In some embodiments, each time resource of the first subset and the second subset of time resources is a transmission time interval (TTI). In some embodiments, the method further includes at least one of identifying, such as via processing circuitry 68, a user equipment (UE) 22 experiencing PIM interference; during a first time resource, communicating, such as via radio interface 62, an uplink grant to the UE 22, the uplink grant scheduling the UE 22 for an uplink transmission at a second time resource different from the first time resource; and during the second time resource occurring after the first time resource, reducing a transmit power on at least one downlink transmission from the base station to the UE 22, the at least one downlink transmission being co-scheduled with the scheduled uplink transmission for the UE 22 at the second time resource. In some embodiments, the determination of the link adaption scheme for the wireless communication based at least on the first interference measurement is a result of an identification of a user equipment (UE) 22 as experiencing the PIM interference and is responsive to determining, such as via processing circuitry 68, that the UE 22 is scheduled for an uplink grant. In some embodiments, the method further includes, as a result of the first interference measurement and the second interference measurement, estimating an interference gain associated with the PIM interference. In some embodiments, the method further includes using the interference gain associated with the PIM interference to determine the link adaption scheme and/or a link adaptation value (or output value) for the wireless communication based at least on the first interference measurement. Of note, it is contemplated that the interference measurements can be based on more than two groups, where the groups can correspond to, for example, levels of PIM or downlink scheduling load on the aggressor downlink channels. In some embodiments, the link adaption scheme may be a link adaption value or indicator.

In some embodiments, the interference gain is a PIM interference gain, the PIM interference gain corresponding to a difference between a first signal-to-interference-plus-noise ratio (SINR) and a second SINR, the first SINR being an average SINR averaged over at least the second subset of time resources and the second SINR being an estimated SINR, the estimated SINR estimated using only time resources associated with the PIM interference. For example, the method may include measuring uplink (UL) interference (e.g., SINR) during time resources (e.g., TTIs, time slots, subslots, etc.) when PIM avoidance (e.g., PIM-AS) is applied and/or it is otherwise determined that PIM UL interference is low, and/or using the UL interference measurements to perform link adaption (LA) for UEs 22 that are scheduled in time resources in which PIM avoidance will be applied and/or during time resources in which it may be otherwise determined that PIM UL interference is low. In some embodiments, LA is performed by estimating SINR for PIM avoidance time resources e.g., using multiple link adaptors (e.g., at least one for PIM-aware LA and another for LA where PIM avoidance is not applied). In other embodiments, LA is performed by selecting applying a PIM avoidance gain as an input to a single link adaptor. Exemplary implementations of these embodiments are described in more detail, particularly with reference to FIGS. 9-11. In some embodiments, the communicating the indication of the link adaption scheme includes communicating the indication of the determined link adaptation scheme to a plurality of user equipments (UEs) 22 served by the base station 16 and scheduled for an uplink transmission during a time resource on which the link adaption scheme is to be applied by the plurality of UEs 22. In some embodiments, the communicating the indication of the link adaption scheme includes communicating the indication of the determined link adaptation scheme to all user equipments (UEs) 22 served by the base station 16 and scheduled for an uplink transmission on a time resource during which the link adaption scheme is to be applied by the UEs 22.

Figure 6:
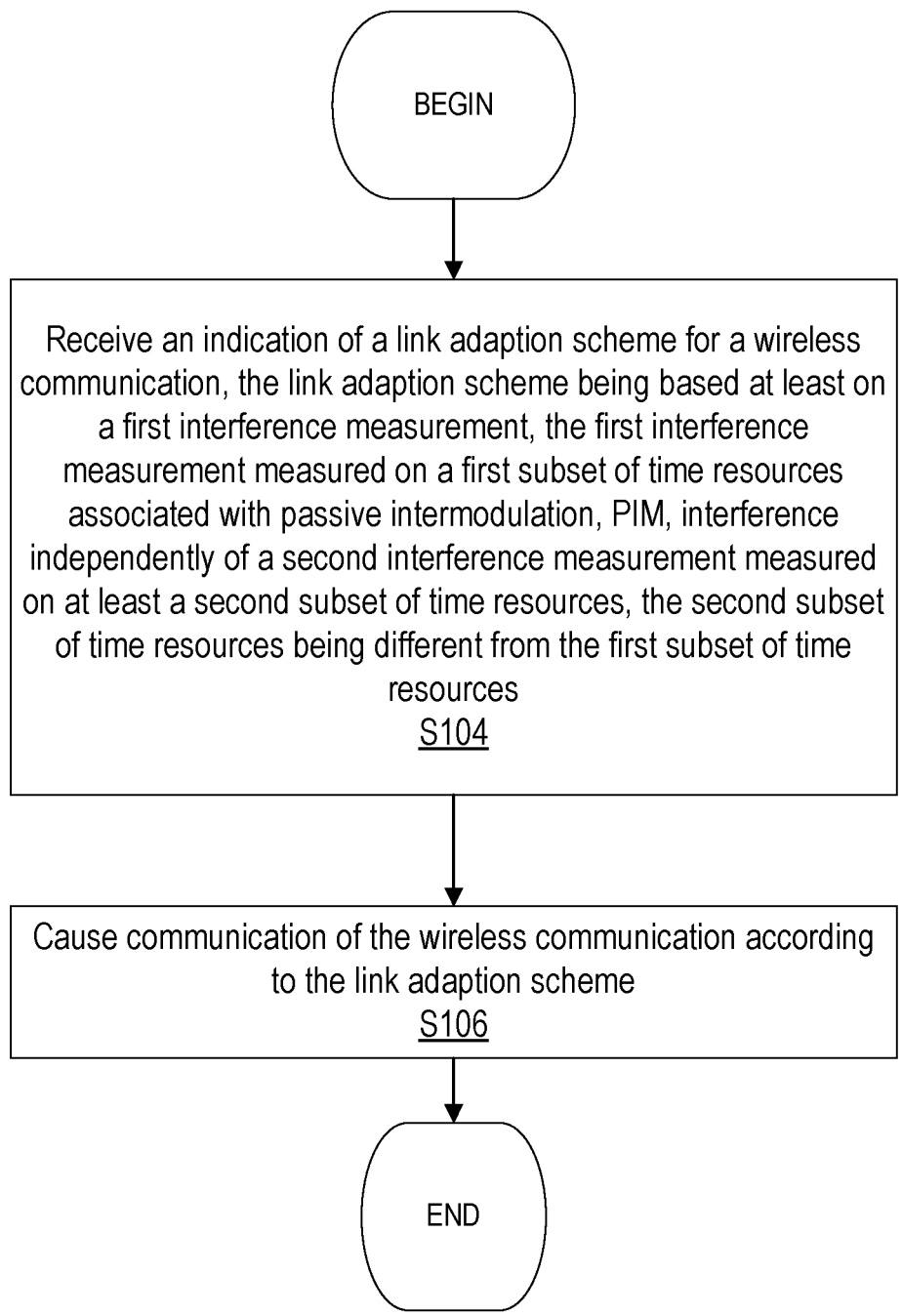
FIG. 6 is a flow diagram of an exemplary communication process in accordance with the principles of the disclosure.

FIG. 6 is a flowchart of an exemplary process in a user equipment 22 in accordance with the principles of the present disclosure. The UE 22 such as via processing circuitry 84 receives an indication of a link adaption scheme for a wireless communication, the link adaption scheme being based at least on a first interference measurement, the first interference measurement measured on a first subset of time resources associated with passive intermodulation, PIM, interference independently of a second interference measurement measured on at least a second subset of time resources, the second subset of time resources being different from the first subset of time resources (Block S104). The UE 22 such as via processing circuitry 84 causes communication of the wireless communication according to the link adaption scheme (Block S106).

According to one embodiment of the exemplary method in the UE 22, the wireless communication is an uplink transmission corresponding to a communication from the UE 22 to a base station 16. In some embodiments, the indication of the link adaption scheme for the wireless communication includes at least an indication of a coding rate for the wireless communication based on at least the first interference measurement. In some embodiments, the indication of the link adaption scheme for the wireless communication includes at least an indication of at least a modulation and coding scheme (MCS) for the wireless communication based on at least the first interference measurement. In some embodiments, the indication of the link adaption scheme for the wireless communication includes at least an indication of at least a modulation and coding scheme (MCS) and a transport block size (TBS) for the wireless communication based on at least the first interference measurement. In some embodiments, the first interference measurement is a signal-to-interference-plus-noise ratio (SINR) for only the first subset of resources associated with the PIM interference. In some embodiments, the second interference measurement is an average signal-to-interference-plus-noise ratio (SINR) over a set of time resources, the set of time resources including the at least the second subset of time resources and the first subset of time resources. In some embodiments, each time resource of the first subset and the second subset of time resources is a transmission time interval (TTI). In some embodiments, the link adaptation scheme for the wireless communication is based on an interference gain, the interference gain determined based on the first interference measurement associated with the PIM interference and the second interference measurement. In some embodiments, the interference gain is a PIM interference gain, the PIM interference gain corresponding to a difference between a first signal-to-interference-plus-noise ratio (SINR) and a second SINR, the first SINR being an average SINR averaged over at least the second subset of time resources and the second SINR being an estimated SINR, the estimated SINR estimated using only time resources associated with the PIM interference.

Having generally described arrangements for providing link adaption for PIM avoidance, details for these arrangements, functions and processes are provided as follows, and which may be implemented by the UE 22, base station 16 and/or host computer 24. Further, examples, embodiments and/or details will now be described.

Some of the examples and embodiments may be described in the context of a particular wireless network, such as, for example, 3GPP LTE; however, it is contemplated that other networks, such as, for example, NR and other Radio Access Technologies (RAT) may benefit from the principles of the present disclosure.

In one embodiment, a control unit in a network node, such as processing circuitry 68 in base station 16, detects a PIM issue, e.g., an increased interference level caused by a downlink (DL) transmission from the base station 16. As a result of detecting the PIM issue, in some embodiments, a form of PIM avoidance may be performed by base station 16, such as, for example, PIM-AS. Such PIM avoidance may be performed in order to improve, for example, network throughput, control signaling, and/or other network KPIs, as compared to channel performance without PIM avoidance. Exemplary techniques for detecting a PIM issue and performing PIM-AS are beyond the scope of this disclosure and are disclosed, for example, in U.S. Pat. No. 9,432,131, which is incorporated in its entirety herein by reference.

Exemplary PIM-AS techniques have also been described herein with reference to FIG. 1 (e.g., modifying the DL scheduler such that the two downlink carriers causing PIM do not transmit at high loads simultaneously).

PIM-AS at a particular TTI may be performed when a particularly vulnerable UE 22 (e.g., with low SINR) is scheduled in an UL grant. In other embodiments, PIM-AS may be performed e.g., periodically to improve Physical Random Access Channel (PRACH) such that, for example, at least some of the time resources scheduled for PRACH transmissions may benefit from eliminating or at least reducing PIM interference. In yet other embodiments, PIM avoidance techniques such as PIM-AS may be performed by the base station 16 or another node according to other trigger conditions.

Some embodiments of the present disclosure provide for apparatuses and methods for link adaptation when performing PIM avoidance, such as PIM-AS. Some embodiments include: 1) measuring UL interference (e.g., SINR) during time resources (e.g., TTIs, time slots, subslots, etc.) when PIM avoidance (e.g., PIM-AS) is applied and/or it is otherwise determined that PIM UL interference is low, and/or 2) using the UL interference measurement to perform link adaption (LA) for UEs 22 that are scheduled in time resources in which PIM-AS will be applied and/or during time resources in which it may be otherwise determined that PIM UL interference is low. Example implementations for measuring UL interference and for performing link adaption according to the principles of the disclosure are described in more detail below with reference to FIG. 7 and FIG. 8, respectively.

Figure 7:
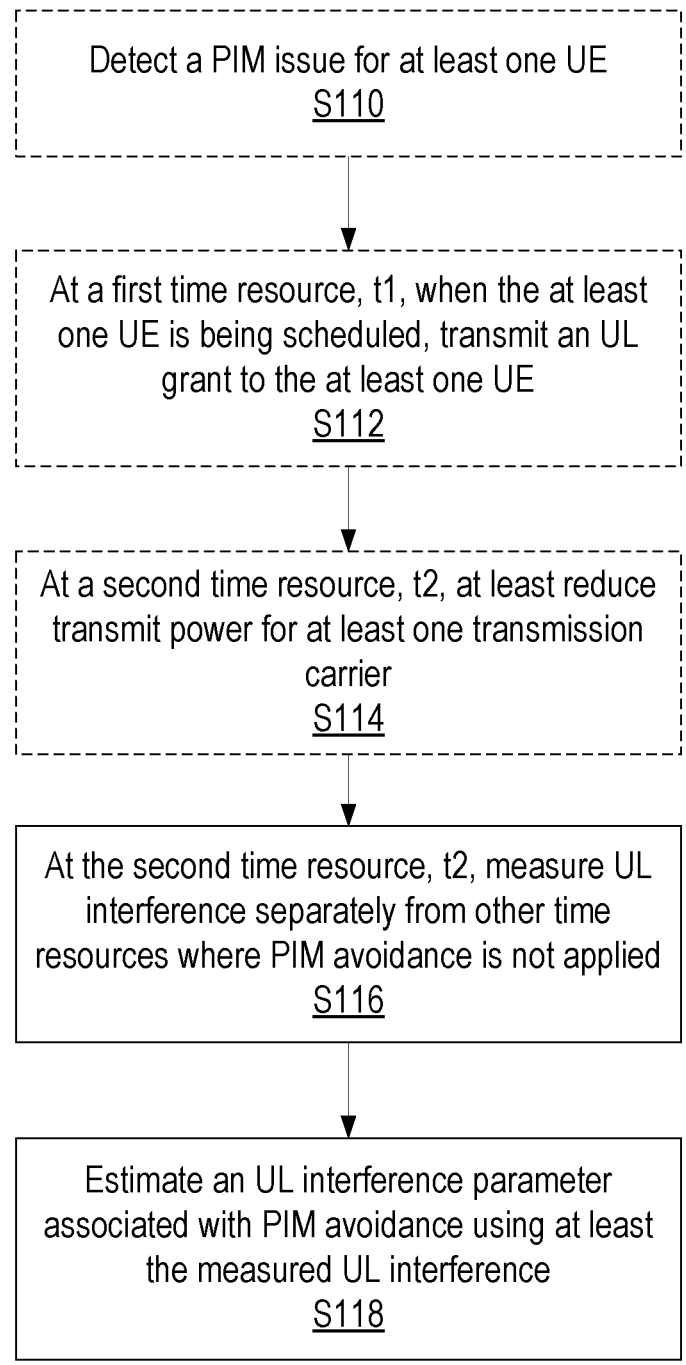
FIG. 7 is a flow diagram of an exemplary process for measuring UL interference in accordance with the principles of the disclosure.
Figure 10:
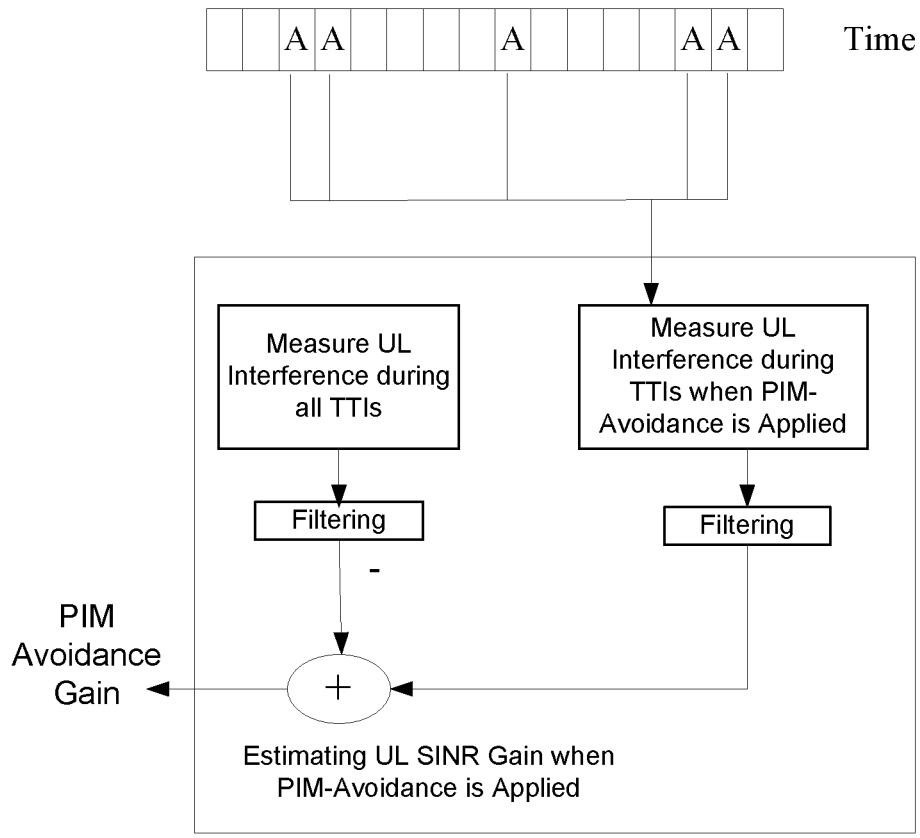
FIG. 10 is a schematic diagram illustrating an exemplary implementation for estimating a PIM avoidance gain in accordance with the principles of the present disclosure.

FIG. 7 illustrates a flow chart for an exemplary method for PIM interference measurement and/or estimation in base station 16, according to an aspect of the disclosure. In some embodiments, the exemplary method is for PIM-AS UL interference measurement, SINR gain measurement, and/or SINR estimation in the base station 16. Exemplary architecture for implementing at least some of the steps in FIG. 7 is illustrated in FIG. 10, which will be described in more detail below.

Optionally, the exemplary method includes detecting a PIM issue for at least one UE 22 (Block S110). For example, processing circuitry 68 in base station 16 may detect PIM UL interference for at least one UE 22.

Optionally, the method further includes, as a result of the detection, at a first time resource (t1) when a PIM-vulnerable UE 22 is being scheduled, the base station 16 may transmit an UL grant to the UE 22, which UL grant may be considered valid for a second time resource (t2) (Block S112). In some embodiments, the time resources may be TTIs and in other embodiments the time resources may be other time periods. In one embodiment, the second time resource, t2, may be 4 TTIs after the first time source, t1. In other embodiments, there may be different spacing between the first and second time resources or instances.

Optionally, the method may include, at a second time resource (t2) at least reducing the transmit power for at least one transmission carrier (e.g., DL carrier) controlled by base station 16 to avoid PIM (Block S114). In some embodiments, such at least reduction of transmit power may include deliberately not scheduling Physical Downlink Shared Channel (PDSCH) transmissions in a subframe corresponding to t2 or scheduling very few PDSCH resource block transmissions in such subframe. In some embodiments, the base station 16 may at least reduce transmit power in the DL by only transmitting certain signals, such as, for example system information or reference signals. In one embodiment, the base station 16 may limit DL transmissions to one or more of, for example, Cell-Specific Reference Signal (CRS), Physical Control Format Indicator Channel (PCFICH), Physical HARQ Indicator Channel (PHICH), Physical Downlink Control Channel (PDCCH), Primary Synchronization Signal (PSS), Secondary Synchronization Signal (SSS), Master Information Block (MIB), System Information Blocks (SIBs). In some embodiments, such transmissions may be at a lower transmit power that is nominally used by the base station 16. Stated another way, the base station 16 may transmit in the DL at a transmit power that is lower than transmit power used for DL transmissions where there is no expectation of a PIM interference issue. The PIM interference affecting the UL transmissions of the UE 22 may therefore be substantially reduced. In some embodiments, the decision to reduce transmit power may be triggered by a UE 22 being scheduled at t1 (e.g., TTI in which an UL grant for the UE 22 has been transmitted or determined) and the DL scheduler in base station 16 being aware that a PIM vulnerable UE 22 has been granted an UL grant for t2. Stated another way, the decision to reduce DL transmit power may be triggered by a PIM-vulnerable UE 22 being granted an UL grant. In other embodiments, there may be other triggers to reduce the transmit power and/or perform PIM avoidance, such as, for example, periodic reductions to improve PRACH access or other control signaling.

The method may include, at a second time resource (t2), the base station 16 measuring UL interference (e.g., UL SINR) separately (or independently) from other time resources where PIM avoidance (e.g., PIM-AS) is not applied (Block S116). The UL interference may be measured on an UL channel, such as, for example, Physical Uplink Control Channel (PUCCH). In other embodiments, the UL interference may be measured on other UL channels. In some embodiments, the measurement of UL interference during t2 may be considered a first interference measurement measured on a first subset of time resources associated with PIM interference and the other time resources where PIM avoidance is not applied may be considered a second interference measurement measured on a second subset of time resources, different from the first subset of time resources. In other words, there may be separate UL interference measurements on time resources where PIM avoidance is applied and on time resources where PIM avoidance is not applied in order to, for example, determine an improvement or gain associated with the application of PIM avoidance (e.g., PIM-AS) or other low PIM condition. In some embodiments, the second time resource may be considered to be associated with PIM interference because PIM avoidance (e.g., PIM-AS) is applied on such second time resource, t2, in the DL by base station 16 in order to at least reduce PIM interference on a co-scheduled UL transmission. The measured UL interference may be recorded or stored on memory 72 in base station 16. In some embodiments, the decision to measure the UL interference (e.g., SINR) may be triggered independently of PIM-AS. For example, during low Physical Resource Block (PRB) utilization, it may be inferred that PIM interference will be low, and therefore the UL interference during such time resources may be measured and tagged or determined by base station 16 to be a low PIM UL interference measurement.

The method may further include estimating an UL interference parameter (e.g., estimated SINR, estimated UL SINR gain, etc.) associated with PIM avoidance using at least the measured UL interference (Block S118). In some embodiments, estimating the UL interference parameter may include combining a plurality of UL interference measurements performed according to, for example, the techniques described in Block S116 (e.g., measuring UL interference in a plurality of time resources where PIM-AS is applied). In some embodiments, estimating the UL interference parameter may include applying filtering to a plurality of UL interference measurements and estimating the UL interference parameter (e.g., estimated SINR, estimated UL SINR gain, corrected SINR, etc.) using UL interference measurements on time resources where PIM-AS is applied and/or on time resources where PIM interference is determined to be low. In some embodiments, the UL interference parameter for PIM-AS and/or low PIM is a value that is much higher than, for example, value corresponding to an average UL SINR measured over all or a set of time resources (e.g., TTIs). In some embodiments, the average UL SINR is measured over both non-PIM avoidance time resources as well as PIM avoidance time resources. In other embodiments, the average UL SINR is measured over only non-PIM avoidance time resources. In some embodiments, the UL interference parameter is an estimate of the PIM-AS gain, which can be determined by comparing the separate UL interference measurements (e.g., average UL SINR and PIM-AS/low PIM UL SINR), as illustrated in FIG. 10. One such example of determining the estimated PIM-AS gain via a comparison is to subtract the UL SINR from the PIM-AS/low PIM UL SINR. In other embodiments, there may be other statistical or computational techniques for estimating PIM-AS gain.

Figure 8:
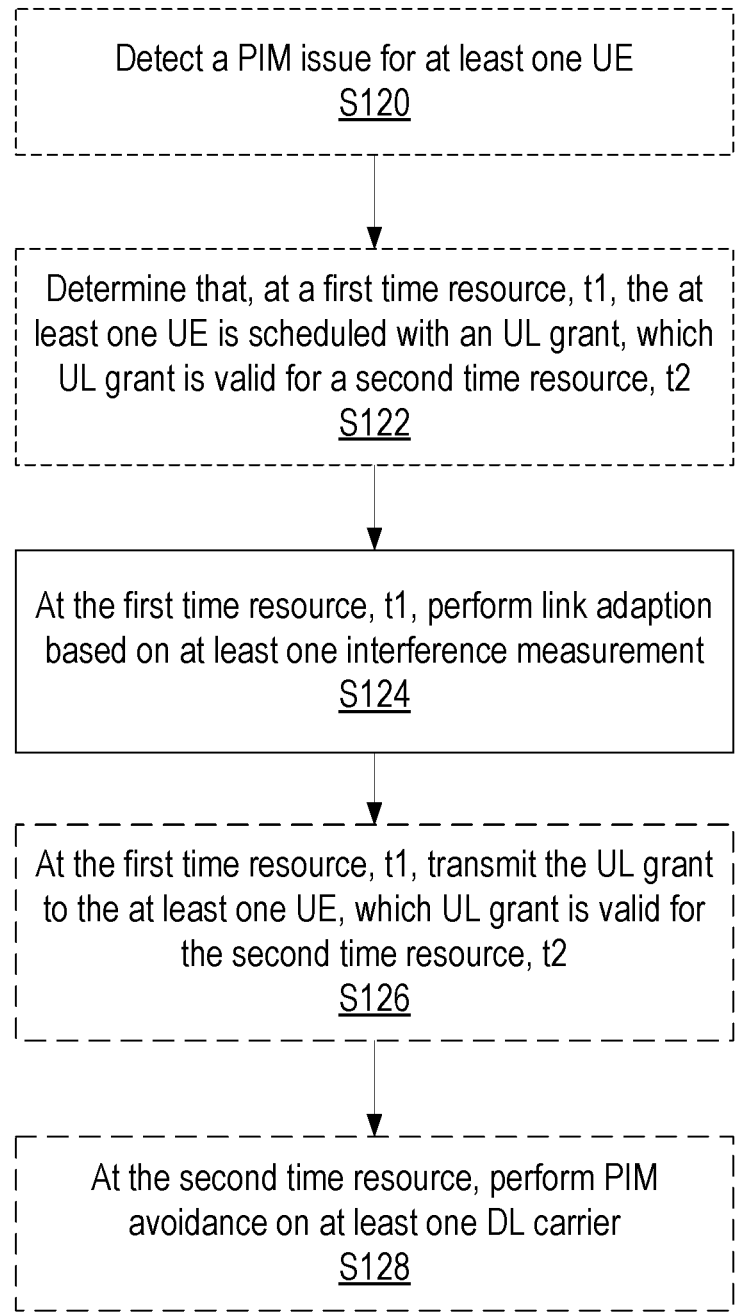
FIG. 8 is a flow diagram of an exemplary process for performing link adaption based on the measured UL interference in accordance with the principles of the disclosure.

FIG. 8 illustrates a flow chart for an exemplary method in base station 16 of performing link adaption according to an aspect of the disclosure. In particular, in some embodiments, the exemplary method includes determining an indication of a link adaption scheme (e.g., coding rate, MCS, TBS, etc.) based on interference measurements, such as the UL interference measurements described above with respect to Block S116. More specifically, in some embodiments, the exemplary method includes determining the link adaption scheme using the UL interference parameter determined based on the UL interference measurements in accordance with, for example, the techniques described above with respect to Block S118. In some embodiments, the exemplary method of performing link adaption may be considered a PIM-AS Link Adaption procedure and may be performed by a network node scheduler in, for example, processing circuitry 68 of base station 16.

Optionally, the exemplary method of FIG. 8 includes detecting a PIM issue for at least one UE 22 (Block S120). For example, processing circuitry 68 of base station 16 may detect PIM UL interference for at least one UE 22.

Optionally, the exemplary method includes, as a result of the detection, determining that, at a first time resource (t1), the at least one UE 22 is scheduled with an UL grant, which UL grant is valid for a second time resource (t2) (Block S122).

Figure 9:
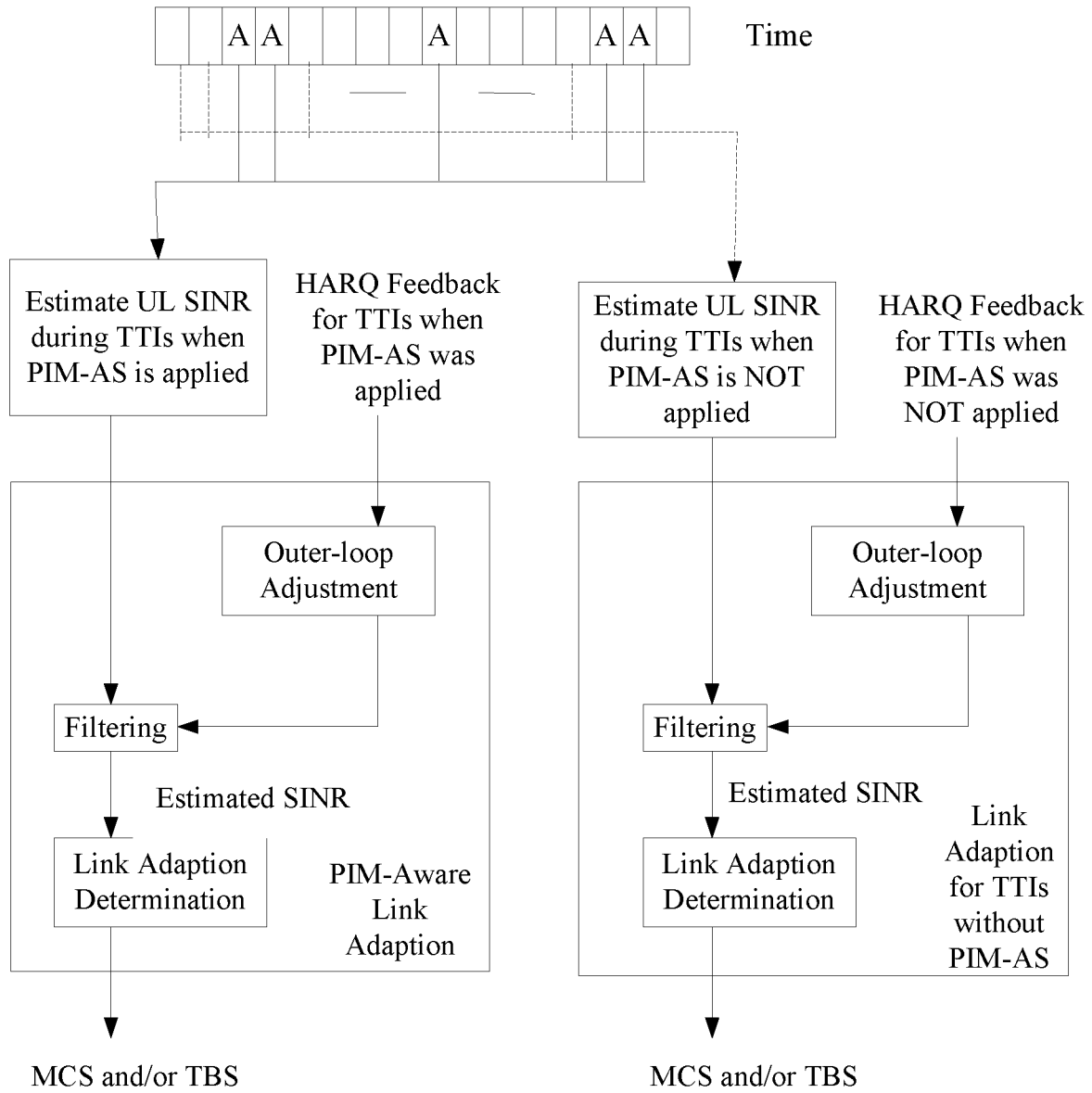
FIG. 9 is a schematic diagram illustrating an exemplary implementation of link adaption with separate link adaptors in accordance with the principles of the disclosure.
Figure 11:
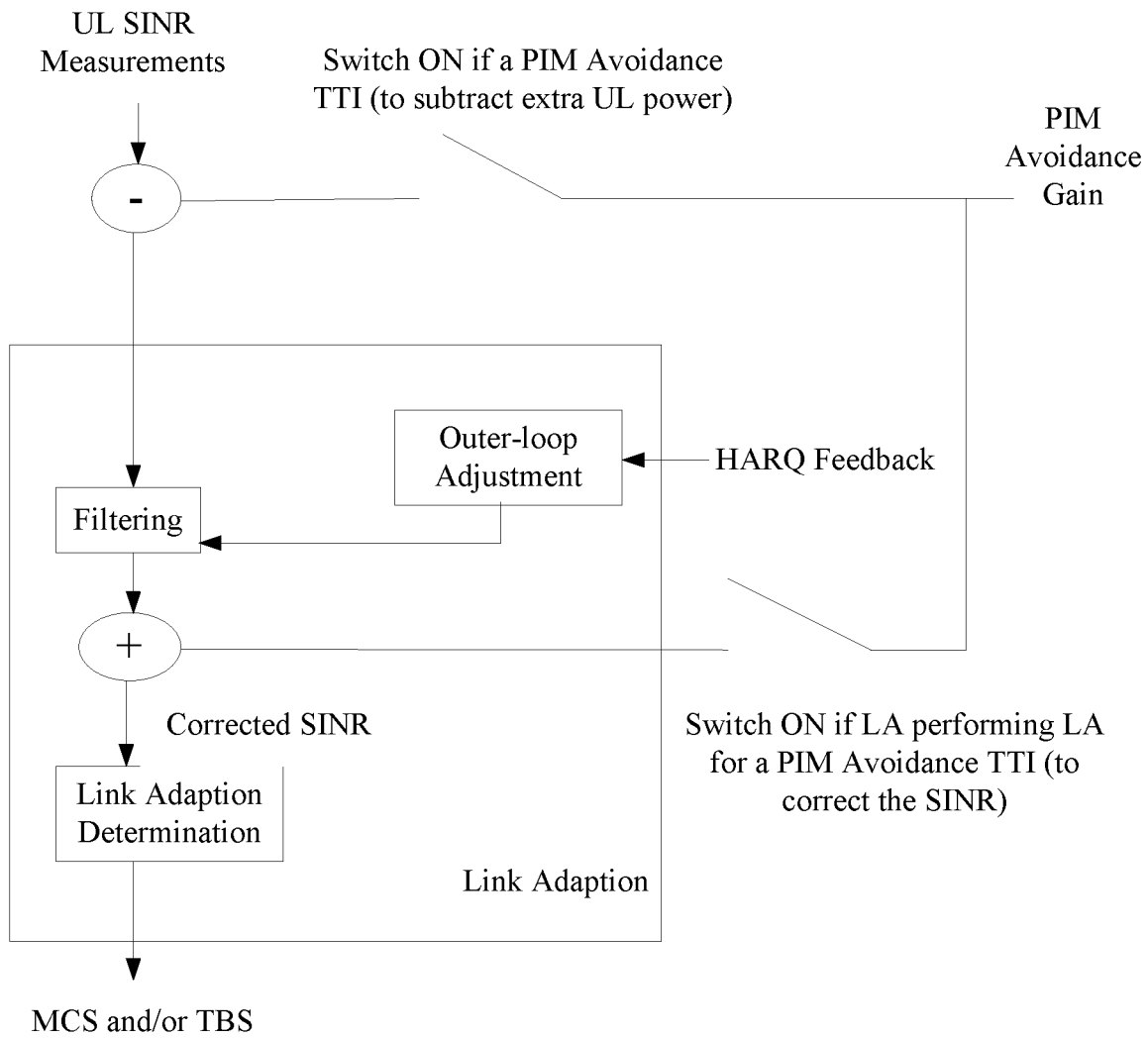
FIG. 11 is a schematic diagram illustrating an exemplary implementation of link adaption with a single link adaptor using the PIM avoidance gain as an input in accordance with the principles of the present disclosure.

The exemplary method includes, at the first time resource (t1), performing link adaption based on at least one interference measurement (Block S124), such as the UL interference measurement described above with respect to Block S116. In further embodiments, performing link adaption may include determining an indication of a link adaptation scheme, such as at least a coding rate, corresponding to the UL grant for the at least one UE 22. In some embodiments, performing link adaption may include determining a MCS and TBS corresponding to the UL grant for the at least one UE 22. The base station 16, such as via a network node scheduler at processing circuitry 68, may determine that PIM-aware link adaption may be used, instead of the average UL SINR, as may be conventionally used in some networks for LA. In some embodiments, such determination that PIM-aware link adaption will be used for a particular UL grant, instead of conventional link adaption, may be triggered by the base station 16 determining an UL grant for at least one PIM-vulnerable UE 22, such as described in Blocks 120 and 122. Accordingly, an UL interference parameter (e.g., a corrected PIM-AS UL SINR, estimated SINR, estimated SINR gain, etc.) may be used for UL link adaption for the at least one UE 22, and, in some embodiments, for all or at least a subset of a plurality of UEs 22 scheduled in the particular time resource (e.g., t2 TTI). In one embodiment, the UL interference parameter (e.g., estimated SINR) is tracked separately for each UE 22 in a separate link adaptor, as illustrated, for example, in FIG. 9. In another embodiment, the UL interference parameter (e.g., PIM-AS UL gain) is estimated (see e.g., FIG. 10), and then applied to correct the average UL SINR (see e.g., FIG. 11) before the link adaption scheme (e.g., MCS and TBS) is selected. In some embodiments, the PIM-AS UL gain may be determined on a per-UE 22 basis, or may be estimated for all or at least a plurality of UEs 22 to, for example, reduce state complexity. In some embodiments, the base station 16 may be configured to schedule a plurality of PIM-vulnerable UEs 22 in the same time resource. Exemplary architecture for implementing Block S124, according to some embodiments, is illustrated in FIGS. 9-11.

Optionally, the exemplary method may include, at a first time resource (t1), transmitting the UL grant to the at least one UE 22, which UL grant may be valid for a second time resource (t2) (Block S126). In some embodiments, base station 16 may, at the first time resource (t1), transmit an UL grant to a plurality of UEs 22 for UL transmission during t2.

Optionally, the exemplary method may include, at the second time resource (t2), performing PIM avoidance on at least one DL carrier (Block S128). In some embodiments, performing PIM avoidance may include reducing transmit power on at least one DL carrier, as discussed herein above. In some embodiments, the UL throughput may be measured to verify an increase in UL throughput due to the PIM-AS Link Adaptation procedure and/or to verify that the corrected PIM-AS SINR or PIM-AS SIRN gain is performing as expected, such as, according to at least a predetermined threshold value.

In some embodiments, at least some of the process steps described with reference to the flow charts in FIGS. 5-8 may repeat. For example, at the second time resource (t2), in addition to transmitting the UL grant as described in Block S126 of FIG. 8, the measurements of UL interference in accordance with Block S116 of FIG. 7 may also be performed. In some embodiments, all or at least some of the UL PIM-AS interference measurements may be stored in memory 72 in, for example, a table of interference measurements.

FIG. 9 illustrates one exemplary implementation of PIM-AS Link Adaption according to the principles of the present disclosure, and, in particular, an exemplary implementation with at least two separate link adaptors (a first link adaptor for PIM-aware link adaption and a second link adaptor for time resources where PIM avoidance is not applied). Such arrangement of having separate link adaptors may be beneficial for integrating legacy operation with operation according to the present disclosure and/or for more conveniently separating Hybrid Automatic Repeat reQuest (HARQ) feedback for PIM-AS and for non-PIM-AS TTIs. In some embodiments, each link adaptor operates separately and uses its own UL SINR measurements and outer loop adjustments, as shown, for example, in FIG. 9. The separate link adaptors may therefore converge at different rates.

FIGS. 10 and 11 illustrate an alternative implementation of PIM-AS Link Adaption according to the principles of the present disclosure, and, in particular, an exemplary implementation where a single link adaptor is used. In some embodiments, an UL SINR gain is estimated and provided as a correction factor. This alternative implementation may provide less state complexity and may expedite the convergence of the PIM UL SINR estimation. In other embodiments, the UL SINR gain may be computed per UE 22, as well.

In particular, FIG. 10 illustrates an example of an UL gain estimation for when PIM-AS is applied and FIG. 11 illustrates an example of the UL gain estimation being used as a selectable input for the link adaptor. One advantage of this implementation is that a single gain can be estimated and applied for all or a plurality of UEs 22. It is noted that the estimated gain may be converted to the appropriate metric, such as noise power, prior to being applied across the UEs 22.

In some embodiments, the corrected PIM-AS SINR (and/or SINR gain) may be estimated at a Physical Resource Block (PRB) granularity for use in UL Frequency Selective Scheduling (FSS).

In some embodiments, the corrected PIM-AS SINR (and/or SINR gain) may be estimated for different DL carrier PRB utilizations, and separately for each DL carrier, i.e., a correction factor corresponding to different loads to provide for even more accuracy.

In some embodiments, the corrected PIM-AS SINR (and/or SINR gain) may be estimated for different channels, such as the PUCCH for similar usage in PUCCH LA.

Some embodiments of the present disclosure include a method to measure the UL SINR for TTIs when PIM-AS is applied. Further embodiments may include one or more of:

a. measuring a SINR gain over the conventional average SINR, or as an explicit value;

b. measuring per UE 22, or as an average gain for all or a plurality of UEs 22;

c. measuring at different frequency granularities (e.g., PRBs) and on different channels (e.g., PUCCH, Physical Uplink Shared Channel (PUSCH), etc.); and d. measuring for different downlink (DL) PRB utilizations and separately for different carriers.

Some embodiments of the present disclosure include a method to use a corrected UL SINR in UL link adaption for TTIs when PIM-AS is anticipated or determined to be applied. Further embodiments may include one or more of:

a. using the corrected UL SINR for UL FSS as well, and for link adaption for different channels (e.g., PUSCH, PUCCH); and b. different correction level being applied depending on the DL PRB utilization anticipated from PIM-AS.

Some other embodiments include:

According to one aspect of the disclosure, a base station 16 is provided. The base station 16 includes processing circuitry 68 configured to determine an indication of a link adaption scheme for a wireless communication based at least on a first interference measurement, the first interference measurement measured on a first subset of time resources associated with passive intermodulation, PIM, interference independently of a second interference measurement measured on at least a second subset of time resources, the second subset of time resources being different from the first subset of time resources, and cause communication of the indication of the determined link adaption scheme.

According to one embodiment of this aspect, the link adaption scheme for the wireless communication is for an uplink transmission corresponding to a communication from a user equipment, UE 22, to the base station 16. According to another embodiment of this aspect, the processing circuitry 68 is further configured to determine the link adaption scheme for the wireless communication based at least on the first interference measurement by determining at least a coding rate for the wireless communication based on at least the first interference measurement. In some embodiments of this aspect, the processing circuitry 68 is further configured to determine the link adaption scheme for the wireless communication based at least on the first interference measurement by determining at least a modulation and coding scheme, MCS, for the wireless communication based on at least the first interference measurement. In some embodiments of this aspect, the processing circuitry 68 is further configured to determine the link adaption scheme for the wireless communication based at least on the first interference measurement by determining at least a modulation and coding scheme, MCS, and a transport block size, TBS, for the wireless communication based on at least the first interference measurement. In some embodiments of this aspect, the processing circuitry 68 is further configured to measure the first interference measurement on the first subset of resources associated with the PIM interference, and independently of the measurement of the first interference measurement, measure the second interference measurement on the at least the second subset of time resources, the at least the second subset of time resources including time resources indicated as being without PIM interference. In some embodiments of this aspect, the first interference measurement is a signal-to-interference-plus-noise ratio, SINR, for only the first subset of resources associated with the PIM interference. In some embodiments of this aspect, the second interference measurement is an average signal-to-interference-plus-noise ratio, SINR, over a set of time resources, the set of time resources including the at least the second subset of time resources and the first subset of time resources. In some embodiments of this aspect, each time resource of the first subset and the second subset of time resources is a transmission time interval, TTI. In some embodiments of this aspect, the processing circuitry 68 is further configured to at least one of: identify a user equipment, UE 22, experiencing PIM interference; during a first time resource, communicate an uplink grant to the UE 22, the uplink grant scheduling the UE 22 for an uplink transmission at a second time resource different from the first time resource; and during the second time resource occurring after the first time resource, reduce a transmit power on at least one downlink transmission from the base station 16 to the UE 22, the at least one downlink transmission being co-scheduled with the scheduled uplink transmission for the UE 22 at the second time resource. In some embodiments of this aspect, the determination of the link adaption scheme for the wireless communication based at least on the first interference measurement is a result of an identification of a user equipment, UE 22, as experiencing the PIM interference and is responsive to determining that the UE 22 is scheduled for an uplink grant. In some embodiments of this aspect, the processing circuitry 68 is further configured to, as a result of the first interference measurement and the second interference measurement, estimate an interference gain associated with the PIM interference. In some embodiments of this aspect, the processing circuitry 68 is further configured to use the interference gain associated with the PIM interference to determine the link adaption scheme and/or a link adaptation value (or output value) for the wireless communication based at least on the first interference measurement. In some embodiments of this aspect, the interference gain is a PIM interference gain, the PIM interference gain corresponding to a difference between a first signal-to-interference-plus-noise ratio, SINR, and a second SINR, the first SINR being an average SINR averaged over at least the second subset of time resources and the second SINR being an estimated SINR, the estimated SINR estimated using only time resources associated with the PIM interference. In some embodiments of this aspect, the processing circuitry 68 is further configured to communicate the indication of the determined link adaptation scheme to a plurality of user equipments, UEs 22, served by the base station 16 and scheduled for an uplink transmission during a time resource on which the link adaption scheme is to be applied by the plurality of UEs 22. In some embodiments of this aspect, the processing circuitry 68 is further configured to communicate the indication of the determined link adaptation scheme to all user equipments, UEs 22, served by the base station 16 and scheduled for an uplink transmission on a time resource during which the link adaption scheme is to be applied by the UEs 22.

According to another aspect, a method for a base station 16 is provided. The method includes determining an indication of a link adaption scheme for a wireless communication based at least on a first interference measurement, the first interference measurement measured on a first subset of time resources associated with passive intermodulation, PIM, interference independently of a second interference measurement measured on at least a second subset of time resources, the second subset of time resources being different from the first subset of time resources, and causing communication of the indication of the determined link adaption scheme.

According to one embodiment of this aspect, the link adaption scheme for the wireless communication is for an uplink transmission corresponding to a communication from a user equipment, UE 22, to the base station 16. In some embodiments of this aspect, determining the link adaption scheme for the wireless communication based at least on the first interference measurement further comprises determining at least a coding rate for the wireless communication based on at least the first interference measurement. In some embodiments of this aspect, determining the link adaption scheme for the wireless communication based at least on the first interference measurement further comprises determining at least a modulation and coding scheme, MCS, for the wireless communication based on at least the first interference measurement. In some embodiments of this aspect, determining the link adaption scheme for the wireless communication based at least on the first interference measurement further comprises determining at least a modulation and coding scheme, MCS, and a transport block size, TBS, for the wireless communication based on at least the first interference measurement. In some embodiments of this aspect, the method further comprises measuring the first interference measurement on the first subset of resources associated with the PIM interference; and independently of the measuring of the first interference measurement, measuring the second interference measurement on the at least the second subset of time resources, the at least the second subset of time resources including time resources indicated as being without PIM interference. In some embodiments of this aspect, the first interference measurement is a signal-to-interference-plus-noise ratio, SINR, for only the first subset of resources associated with the PIM interference. In some embodiments of this aspect, the second interference measurement is an average signal-to-interference-plus-noise ratio, SINR, over a set of time resources, the set of time resources including the at least the second subset of time resources and the first subset of time resources. In some embodiments of this aspect, each time resource of the first subset and the second subset of time resources is a transmission time interval, TTI. In some embodiments of this aspect, the method further includes at least one of: identifying a user equipment, UE 22, experiencing PIM interference; during a first time resource, communicating an uplink grant to the UE 22, the uplink grant scheduling the UE 22 for an uplink transmission at a second time resource different from the first time resource; and during the second time resource occurring after the first time resource, reducing a transmit power on at least one downlink transmission from the base station 16 to the UE 22, the at least one downlink transmission being co-scheduled with the scheduled uplink transmission for the UE 22 at the second time resource. In some embodiments of this aspect, the determination of the link adaption scheme for the wireless communication based at least on the first interference measurement is a result of an identification of a user equipment, UE 22, as experiencing the PIM interference and is responsive to determining that the UE 22 is scheduled for an uplink grant. In some embodiments of this aspect, the method further includes, as a result of the first interference measurement and the second interference measurement, estimating an interference gain associated with the PIM interference. In some embodiments of this aspect, the method further includes using the interference gain associated with the PIM interference to determine the link adaption scheme and/or a link adaptation value (or output value) for the wireless communication based at least on the first interference measurement. In some embodiments of this aspect, the interference gain is a PIM interference gain, the PIM interference gain corresponding to a difference between a first signal-to-interference-plus-noise ratio, SINR, and a second SINR, the first SINR being an average SINR averaged over at least the second subset of time resources and the second SINR being an estimated SINR, the estimated SINR estimated using only time resources associated with the PIM interference. In some embodiments of this aspect, the communicating the indication of the link adaption scheme comprises communicating the indication of the determined link adaptation scheme to a plurality of user equipments, UEs 22, served by the base station 16 and scheduled for an uplink transmission during a time resource on which the link adaption scheme is to be applied by the plurality of UEs 22. In some embodiments of this aspect, the communicating the indication of the link adaption scheme comprises communicating the indication of the determined link adaptation scheme to all user equipments, UEs 22, served by the base station 16 and scheduled for an uplink transmission on a time resource during which the link adaption scheme is to be applied by the UEs 22.

In another aspect of the present disclosure, a user equipment, UE 22, is provided. The UE 22 includes processing circuitry 84 configured to receive an indication of a link adaption scheme for a wireless communication, the link adaption scheme being based at least on a first interference measurement, the first interference measurement measured on a first subset of time resources associated with passive intermodulation, PIM, interference independently of a second interference measurement measured on at least a second subset of time resources, the second subset of time resources being different from the first subset of time resources, and cause communication of the wireless communication according to the link adaption scheme.

In one embodiment of this aspect, the wireless communication is an uplink transmission corresponding to a communication from the UE 22 to a base station 16. In some embodiments of this aspect, the indication of the link adaption scheme for the wireless communication includes at least an indication of a coding rate for the wireless communication based on at least the first interference measurement. In some embodiments of this aspect, the indication of the link adaption scheme for the wireless communication includes at least an indication of at least a modulation and coding scheme, MCS, for the wireless communication based on at least the first interference measurement. In some embodiments of this aspect, the indication of the link adaption scheme for the wireless communication includes at least an indication of at least a modulation and coding scheme, MCS, and a transport block size, TBS, for the wireless communication based on at least the first interference measurement. In some embodiments of this aspect, the first interference measurement is a signal-to-interference-plus-noise ratio, SINR, for only the first subset of resources associated with the PIM interference. In some embodiments of this aspect, the second interference measurement is an average signal-to-interference-plus-noise ratio, SINR, over a set of time resources, the set of time resources including the at least the second subset of time resources and the first subset of time resources. In some embodiments of this aspect, each time resource of the first subset and the second subset of time resources is a transmission time interval, TTI. In some embodiments of this aspect, the link adaptation scheme for the wireless communication is based on an interference gain, the interference gain based on the first interference measurement associated with the PIM interference and the second interference measurement. In some embodiments of this aspect, the interference gain is a PIM interference gain, the PIM interference gain corresponding to a difference between a first signal-to-interference-plus-noise ratio, SINR, and a second SINR, the first SINR being an average SINR averaged over at least the second subset of time resources and the second SINR being an estimated SINR, the estimated SINR estimated using only time resources associated with the PIM interference.

According to yet another aspect of the present disclosure, a method for a user equipment, UE 22, is provided. The method includes receiving an indication of a link adaption scheme for a wireless communication, the link adaption scheme being based at least on a first interference measurement, the first interference measurement measured on a first subset of time resources associated with passive intermodulation, PIM, interference independently of a second interference measurement measured on at least a second subset of time resources, the second subset of time resources being different from the first subset of time resources, and causing communication of the wireless communication according to the link adaption scheme.

In one embodiment of this aspect, the wireless communication is an uplink transmission corresponding to a communication from the UE 22 to a base station 16. In some embodiments of this aspect, the indication of the link adaption scheme for the wireless communication includes at least an indication of a coding rate for the wireless communication based on at least the first interference measurement. In some embodiments of this aspect, the indication of the link adaption scheme for the wireless communication includes at least an indication of at least a modulation and coding scheme, MCS, for the wireless communication based on at least the first interference measurement. In some embodiments of this aspect, the indication of the link adaption scheme for the wireless communication includes at least an indication of at least a modulation and coding scheme, MCS, and a transport block size, TBS, for the wireless communication based on at least the first interference measurement. In some embodiments of this aspect, the first interference measurement is a signal-to-interference-plus-noise ratio, SINR, for only the first subset of resources associated with the PIM interference. In some embodiments of this aspect, the second interference measurement is an average signal-to-interference-plus-noise ratio, SINR, over a set of time resources, the set of time resources including the at least the second subset of time resources and the first subset of time resources. In some embodiments of this aspect, each time resource of the first subset and the second subset of time resources is a transmission time interval, TTI. In some embodiments of this aspect, the link adaptation scheme for the wireless communication is based on an interference gain, the interference gain determined based on the first interference measurement associated with the PIM interference and the second interference measurement. In some embodiments of this aspect, the interference gain is a PIM interference gain, the PIM interference gain corresponding to a difference between a first signal-to-interference-plus-noise ratio, SINR, and a second SINR, the first SINR being an average SINR averaged over at least the second subset of time resources and the second SINR being an estimated SINR, the estimated SINR estimated using only time resources associated with the PIM interference.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| PIM-AS | PIM-Avoidance Scheduling |
| LA | Link Adaptation |
| FSS | Frequency Selective Scheduling |
| TBS | Transport Block Size |
| MCS | Modulation and Coding Scheme |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A base station comprising:
   processing circuitry configured to:
      determine an indication of a link adaption scheme for a wireless communication based at least on a first interference measurement and a second interference measurement, the first interference measurement being measured on a first subset of time resources associated with passive intermodulation (PIM) interference independently of the second interference measurement, the second interference measurement being measured on at least a second subset of time resources, the second subset of time resources being different from the first subset of time resources,
      wherein the processing circuitry is further configured to determine the link adaption scheme for the wireless communication based at least on the first interference measurement by determining a transport block size (TBS) for the wireless communication based on at least the first interference measurement, and
      wherein the second interference measurement is an average signal-to-interference-plus-noise ratio (SINR) over a set of time resources, the set of time resources including the at least the second subset of time resources and the first subset of time resources; and
      cause communication of the indication of the determined link adaption scheme.

2. The base station according to claim 1, wherein the link adaption scheme for the wireless communication is for an uplink transmission corresponding to a communication from a user equipment (UE), to the base station.

3. The base station according to claim 1, wherein the processing circuitry is further configured to determine the link adaption scheme for the wireless communication based at least on the first interference measurement by determining at least one of:
   a coding rate for the wireless communication based on at least the first interference measurement; and
   a modulation and coding scheme (MCS) for the wireless communication based on at least the first interference measurement.

4. The base station according to claim 1, wherein the processing circuitry is further configured to:
   measure the first interference measurement on the first subset of resources associated with the PIM interference; and
   independently of the measurement of the first interference measurement, measure the second interference measurement on the at least the second subset of time resources, the at least the second subset of time resources including time resources indicated as being without PIM interference.

5. The base station according to claim 1, wherein the first interference measurement is a signal-to-interference-plus-noise ratio (SINR) for only the first subset of resources associated with the PIM interference.

6. The base station according to claim 1, wherein each time resource of the first subset and the second subset of time resources is a transmission time interval (TTI).

7. The base station according to claim 1, wherein the processing circuitry is further configured to at least one of:
   identify a user equipment (UE) experiencing PIM interference;
during a first time resource, communicate an uplink grant to the UE, the uplink grant scheduling the UE for an uplink transmission at a second time resource different from the first time resource; and
   during the second time resource occurring after the first time resource, reduce a transmit power on at least one downlink transmission from the base station to the UE, the at least one downlink transmission being co-scheduled with the scheduled uplink transmission for the UE at the second time resource.

8. The base station according to claim 7, wherein the processing circuitry is further configured to use the interference gain associated with the PIM interference to determine the link adaption scheme for the wireless communication based at least on the first interference measurement.

9. The base station according to claim 7, wherein the interference gain is a PIM interference gain, the PIM interference gain corresponding to a difference between a first signal-to-interference-plus-noise ratio (SINR) and a second SINR, the first SINR being an average SINR averaged over at least the second subset of time resources and the second SINR being an estimated SINR, the estimated SINR estimated using only time resources associated with the PIM interference.

10. A method for a base station, the method comprising:
   determining an indication of a link adaption scheme for a wireless communication based at least on a first interference measurement and a second interference measurement, the first interference measurement being measured on a first subset of time resources associated with passive intermodulation (PIM) interference independently of the second interference measurement, the second interference measurement being measured on at least a second subset of time resources, the second subset of time resources being different from the first subset of time resources, wherein the processing circuitry is further configured to determine the link adaption scheme for the wireless communication based at least on the first interference measurement by determining a transport block size (TBS) for the wireless communication based on at least the first interference measurement, and wherein the second interference measurement is an average signal-to-interference-plus-noise ratio (SINR) over a set of time resources, the set of time resources including the at least the second subset of time resources and the first subset of time resources; and causing communication of the indication of the determined link adaption scheme.

11. The method according to claim 10, wherein determining the link adaption scheme for the wireless communication based at least on the first interference measurement further comprises determining at least one of:
a coding rate for the wireless communication based on at least the first interference measurement;
a modulation and coding scheme (MCS) for the wireless communication based on at least the first interference measurement.

12. The method according to claim 10, further comprising:
measuring the first interference measurement on the first subset of resources associated with the PIM interference; and
independently of the measuring of the first interference measurement, measuring the second interference measurement on the at least the second subset of time resources, the at least the second subset of time resources including time resources indicated as being without PIM interference.

13. The method according to claim 10, wherein the first interference measurement is a signal-to-interference-plus-noise ratio (SINR) for only the first subset of resources associated with the PIM interference.

14. The method according to claim 13, wherein the interference gain is a PIM interference gain, the PIM interference gain corresponding to a difference between a first signal-to-interference-plus-noise ratio (SINR) and a second SINR, the first SINR being an average SINR averaged over at least the second subset of time resources and the second SINR being an estimated SINR, the estimated SINR estimated using only time resources associated with the PIM interference.

15. The method according to claim 10, wherein each time resource of the first subset and the second subset of time resources is a transmission time interval (TTI).

16. The method according to claim 10, further comprising at least one of:
identifying a user equipment (UE) experiencing PIM interference;

during a first time resource, communicating an uplink grant to the UE, the uplink grant scheduling the UE for an uplink transmission at a second time resource different from the first time resource; and
during the second time resource occurring after the first time resource, reducing a transmit power on at least one downlink transmission from the base station to the UE, the at least one downlink transmission being co-scheduled with the scheduled uplink transmission for the UE at the second time resource.

17. The method according to claim 10, wherein the determination of the link adaption scheme for the wireless communication based at least on the first interference measurement is a result of an identification of a user equipment (UE) as experiencing the PIM interference and is responsive to determining that the UE is scheduled for an uplink grant.

18. The method according to claim 10, further comprising, as a result of the first interference measurement and the second interference measurement, estimating an interference gain associated with the PIM interference.

19. The method according to claim 18, further comprising using the interference gain associated with the PIM interference to determine the link adaption scheme for the wireless communication based at least on the first interference measurement.

20. The method according to claim 10, wherein the communicating the indication of the link adaption scheme comprises communicating the indication of the determined link adaptation scheme to a plurality of user equipments (UEs) served by the base station and scheduled for an uplink transmission during a time resource on which the link adaption scheme is to be applied by the plurality of UEs.

21. The base station according to claim 1, wherein the determination of the link adaption scheme for the wireless communication based at least on the first interference measurement is a result of an identification of a user equipment (UE), as experiencing the PIM interference and is responsive to determining that the UE is scheduled for an uplink grant.

22. The base station according to claim 1, wherein the processing circuitry is further configured to, as a result of the first interference measurement and the second interference measurement, estimate an interference gain associated with the PIM interference.

23. The base station according to claim 1, wherein the processing circuitry is further configured to communicate the indication of the determined link adaptation scheme to a plurality of user equipments (UEs) served by the base station and scheduled for an uplink transmission during a time resource on which the link adaption scheme is to be applied by the plurality of UEs.

24. The method according to claim 10, wherein the link adaption scheme for the wireless communication is for an uplink transmission corresponding to a communication from a user equipment (UE) to the base station.

* * * * *